(12) United States Patent
Huibers et al.

(10) Patent No.: US 6,970,281 B2
(45) Date of Patent: Nov. 29, 2005

(54) MICROMIRROR ARRAY HAVING REDUCED GAP BETWEEN ADJACENT MICROMIRRORS OF THE MICROMIRROR ARRAY

(75) Inventors: Andrew Huibers, Palo Alto, CA (US); Satyadev Patel, Sunnyvale, CA (US)

(73) Assignee: Reflectivity, Inc., Sunnyvale, CA (US)

(*) Notice: Subject to any disclaimer, the term of this patent is extended or adjusted under 35 U.S.C. 154(b) by 8 days.

(21) Appl. No.: 11/034,398

(22) Filed: Jan. 11, 2005

(65) Prior Publication Data
US 2005/0231788 A1    Oct. 20, 2005

Related U.S. Application Data

(63) Continuation of application No. 10/627,302, filed on Jul. 24, 2003, which is a continuation-in-part of application No. 10/613,379, filed on Jul. 3, 2003, now Pat. No. 6,873,450.

(51) Int. Cl.[7] ............................................. G02B 26/00
(52) U.S. Cl. .................... 359/290; 359/291; 359/292
(58) Field of Search ............................... 359/290, 291, 359/292, 293, 294, 295, 298

(56) References Cited

U.S. PATENT DOCUMENTS

| | | |
|---|---|---|
| 3,511,727 A | 5/1970 | Hays |
| 4,190,488 A | 2/1980 | Winters |
| 4,310,380 A | 1/1982 | Flamm et al. |
| 4,498,953 A | 2/1985 | Cook et al. |
| 4,695,700 A | 9/1987 | Provence et al. |
| 4,740,410 A | 4/1988 | Muller et al. |

(Continued)

FOREIGN PATENT DOCUMENTS

EP      0704884 A2     4/1996

(Continued)

OTHER PUBLICATIONS

Aliev et al., "Development of Si(100) Surface Roughness at the initial Stage of Etching in F2 and XeF2 Gases Ellipsometric Study", Surface Science 442 (1999), pp. 206-214.

(Continued)

Primary Examiner—Ricky L. Mack
Assistant Examiner—Brandi Thomas
(74) Attorney, Agent, or Firm—Gregory R. Muir

(57) ABSTRACT

A spatial light modulator is disclosed, along with a method for making such a modulator that comprises an array of micromirror devices. The center-to-center distance and the gap between adjacent micromirror devices are determined corresponding to the light source being used so as to optimize optical efficiency and performance quality. The micromirror device comprises a hinge support formed on a substrate and a hinge that is held by the hinge support. A mirror plate is connected to the hinge via a contact, and the distance between the mirror plate and the hinge is determined according to desired maximum rotation angle of the mirror plate, the optimum gap and pitch between the adjacent micromirrors.

In a method of fabricating such spatial light modulator, one sacrificial layer is deposited on a substrate followed by forming the mirror plates, and another sacrificial layer is deposited on the mirror plates followed by forming the hinge supports. The two sacrificial layers are removed via the small gap between adjacent mirror devices with spontaneous vapor phase chemical etchant. Also disclosed is a projection system that comprises such a spatial light modulator, as well as a light source, condensing optics, wherein light from the light source is focused onto the array of micromirrors, projection optics for projecting light selectively reflected from the array of micromirrors onto a target, and a controller for selectively actuating the micromirrors in the array.

52 Claims, 9 Drawing Sheets

U.S. PATENT DOCUMENTS

| | | |
|---|---|---|
| 4,749,440 A | 6/1988 | Blackwood et al. |
| 4,789,426 A | 12/1988 | Pipkin |
| 5,206,471 A | 4/1993 | Smith |
| 5,262,000 A | 11/1993 | Welbourn et al. |
| 5,330,301 A | 7/1994 | Brancher |
| 5,439,553 A | 8/1995 | Grant et al. |
| 5,441,597 A | 8/1995 | Bonne et al. |
| 5,534,107 A | 7/1996 | Gray et al. |
| 5,672,242 A | 9/1997 | Jen |
| 5,696,619 A | 12/1997 | Knipe et al. |
| 5,696,620 A | 12/1997 | Kim |
| 5,701,192 A | 12/1997 | Ji et al. |
| 5,702,569 A | 12/1997 | Park et al. |
| 5,716,495 A | 2/1998 | Butterbaugh et al. |
| 5,726,480 A | 3/1998 | Pister |
| 5,729,074 A | 3/1998 | Shiomi et al. |
| 5,753,073 A | 5/1998 | Jen |
| 5,757,456 A | 5/1998 | Yamazaki et al. |
| 5,757,539 A | 5/1998 | Min |
| 5,774,256 A | 6/1998 | Min et al. |
| 5,822,109 A | 10/1998 | Jeon |
| 5,835,256 A | 11/1998 | Huibers |
| 5,835,293 A | 11/1998 | Min et al. |
| 5,858,065 A | 1/1999 | Li et al. |
| 5,917,045 A | 6/1999 | Lewis et al. |
| 5,994,750 A | 11/1999 | Yagi |
| 6,020,215 A | 2/2000 | Yagi et al. |
| 6,028,690 A | 2/2000 | Carter et al. |
| 6,046,840 A | 4/2000 | Huibers |
| 6,051,503 A | 4/2000 | Bhardwaj |
| 6,104,425 A | 8/2000 | Kanno |
| 6,115,172 A | 9/2000 | Jeong |
| 6,147,790 A | 11/2000 | Meier et al. |
| 6,162,367 A | 12/2000 | Tai et al. |
| 6,197,610 B1 | 3/2001 | Toda |
| 6,203,715 B1 | 3/2001 | Kim et al. |
| 6,204,080 B1 | 3/2001 | Hwang |
| 6,238,581 B1 | 5/2001 | Hawkins et al. |
| 6,277,173 B1 | 8/2001 | Sadakata et al. |
| 6,285,490 B1 | 9/2001 | Meier et al. |
| 6,290,864 B1 | 9/2001 | Patel et al. |
| 6,328,801 B1 | 12/2001 | Gary et al. |
| 6,334,928 B1 | 1/2002 | Sekine et al. |
| 6,355,181 B1 | 3/2002 | McQuarrie |
| 6,396,619 B1 | 5/2002 | Huibers et al. |
| 6,409,876 B1 | 6/2002 | McQuarrie et al. |
| 6,436,229 B2 | 8/2002 | Tai et al. |
| 6,449,079 B1 | 9/2002 | Herrmann |
| 6,479,920 B1 | 11/2002 | Lal et al. |
| 6,500,356 B2 | 12/2002 | Goto et al. |
| 6,522,454 B2 | 2/2003 | Meier et al. |
| 6,523,961 B2 | 2/2003 | Ilkov et al. |
| 6,529,310 B1 | 3/2003 | Huibers et al. |
| 6,576,489 B2 | 6/2003 | Leung et al. |
| 6,819,470 B2 | 11/2004 | Meier et al. |
| 2001/0002663 A1 | 6/2001 | Tai et al |
| 2002/0024641 A1 | 2/2002 | Ilkov et al. |
| 2002/0033229 A1 | 3/2002 | Leboultz et al. |
| 2002/0047172 A1 | 4/2002 | Reid |
| 2002/0093721 A1 | 7/2002 | Knipe |
| 2002/0121502 A1 | 9/2002 | Patel et al. |
| 2002/0132389 A1 | 9/2002 | Patel et al. |
| 2002/0163051 A1 | 11/2002 | Gopal et al. |
| 2002/0164879 A1 | 11/2002 | Leung et al. |
| 2002/0185699 A1 | 12/2002 | Reid |
| 2002/0196524 A1 | 12/2002 | Huibers et al. |
| 2003/0054588 A1 | 3/2003 | Patel et al. |
| 2003/0071015 A1 | 4/2003 | Chinn et al. |
| 2003/0077878 A1 | 4/2003 | Kumar et al. |
| 2003/0117686 A1 | 6/2003 | DiCarlo |
| 2003/0117688 A1 | 6/2003 | Meier et al. |
| 2003/0124848 A1 | 7/2003 | Chinn et al. |
| 2003/0160540 A1 | 8/2003 | Miller et al. |
| 2003/0166342 A1 | 9/2003 | Chinn et al. |
| 2003/0217693 A1 | 11/2003 | Rattner et al. |
| 2003/0219986 A1 | 11/2003 | Rattner et al. |
| 2003/0234994 A1 * | 12/2003 | Pan .......................... 359/871 |
| 2004/0004753 A1 * | 1/2004 | Pan .......................... 359/263 |
| 2004/0008402 A1 * | 1/2004 | Patel et al. ................. 359/291 |
| 2004/0012838 A1 * | 1/2004 | Huibers ..................... 359/291 |
| 2004/0125346 A1 | 7/2004 | Huibers |
| 2004/0156089 A1 * | 8/2004 | Doan et al. ................. 359/291 |
| 2004/0156090 A1 * | 8/2004 | Patel et al. ................. 359/291 |

FOREIGN PATENT DOCUMENTS

| | | |
|---|---|---|
| EP | 0822582 A2 | 2/1998 |
| EP | 0822584 A2 | 4/1998 |
| EP | 0838839 A2 | 4/1998 |
| EP | 0878824 A2 | 11/1998 |
| EP | 0955668 A2 | 11/1999 |
| EP | 0878824 A3 | 1/2000 |
| JP | 1982/57098679 A | 6/1982 |
| JP | 1983/58130529 A | 8/1983 |
| JP | 1985/60057938 A | 4/1985 |
| JP | 1986/61053732 A | 3/1986 |
| JP | 1986/61134019 A | 6/1986 |
| JP | 1986/61181131 A | 8/1986 |
| JP | 1986/61187238 A | 8/1986 |
| JP | 1986/61270830 A | 12/1986 |
| JP | 1987/62071217 A | 4/1987 |
| JP | 1988/63155713 A | 6/1988 |
| JP | 1989/01208834 A | 8/1989 |
| JP | 1989/10217921 A | 8/1989 |
| JP | 1990/02250323 A | 10/1990 |
| JP | 1991/03012921 A | 1/1991 |
| JP | 1992/04096222 A | 3/1992 |
| JP | 1995/07029823 A | 1/1995 |
| JP | 1997/09251981 A | 9/1997 |
| JP | 1998/10313128 A | 11/1998 |
| JP | 1998/10317169 A | 12/1998 |
| WO | WO-98/05605 | 2/1998 |
| WO | WO-98/13856 | 4/1998 |
| WO | WO-98/32163 | 7/1998 |
| WO | WO-99/01887 | 1/1999 |
| WO | WO-99/03313 | 1/1999 |
| WO | WO-99/49506 | 9/1999 |
| WO | WO-00/52740 | 8/2000 |
| WO | WO 2004/000720 | 12/2003 |
| WO | WO 2004/000720 A1 | 12/2003 |
| WO | WO 2004/001487 | 12/2003 |
| WO | WO 2004/001487 A2 | 12/2003 |
| WO | WO 2004/001717 | 12/2003 |

OTHER PUBLICATIONS

Glidemeister, J.M., "Xenon Difluoride Etching System" (Nov. 17, 1997).

Habuka et al., "Dominant Overall Chemical Reaction in a Chlorine Trifluoride-Silicon-Nitrogen System at Atmospheric Pressure", Japan Journal of Applied Physics vol. 38 (1999), pp. 6466-6469.

Hecht et al., "A Novel X-ray Photoelectron Spectroscopy Study of the Al/SiO2 Interface", J. Appl. Phys. vol. 57 (Jun. 15, 1985), pp. 5256-5261.

Houle, F.A., "Dynamics of SiF4 Desorption During Etching of Silicon by Xef2", IBM Almaden Research Center (Apr. 15, 1987), pp. 1866-1872.

Flamm et al., "XeF2 and F-Atom Reactions with SI: Their Significance for Plasma Etching", Solid State Technol. 26, 117 (1983).

Ibbotson et al., "Plasmeless Dry Etching of Silicon with Fluorine-containing Compounds", J. Appl. Phys. vol. 56 No. 10 (Nov. 1984), pp. 2939-2942.

Ibbotson et al., "Comparison of XeF2 and F-atom Reactions with Si and SiO2", Applied Physics Letter, vol. 44, 1129 (1984).

Streller et al., "Selectivity in Dry Etching of Si (100) and XeF2 and VUV Light", Elsevier Science B.V., Applied Surface Science vol. 106 (1996), pp. 341-346.

Vugts et al., "Si/XeF2 Etching: Temperature Dependence", J. Vac. Sci. Technol. A 14(5) (Sep./Oct. 1996), pp. 2766-2774.

Y.K. Fang, et al., The Compatibility of Aluminum Layers on Plasma-Deposited W and WSi2 Films,, 1988 IEEE, IEEE Transactions on Electron Devices, vol. 35, No. 5, May 1988.

Winters, H.F., "Etch Products from the Reaction of XeF2 with Si02, Si03, Si3N4, SiC, and Si in the Presence of Ion Bombardment", J. Vac. Sci. Technol. B 1(4) (Oct./Dec. 1983), pp. 927-931.

Winters et al., "The Etching of Silicon with XeF2 Vapor", Appl. Phys. Letter, vol. 34(1) (Jan. 1, 1979), pp. 70-73.

XACTIX, Inc. Marketing Brochure (Jun. 27, 1999).

"Xenon Difluoride Isotropic Etch System: Seeing is Beleiving", Surface Technology Systems, Ltd. brochure, Newport, UK (date unknown).

Assorted promotional literature, Surface Technology Systems Ltd., Newport, UK (Jul. 28, 1999).

Kurt Williams, Etch Rates for Micromachining Processing-Part II, 2003 IEEE, pp. 761-778, Journal of Microelectromechanical Systems, vol. 12, No. 6, Dec. 2003.

G.J. van Gurp, et al., Aluminum-sillicide reactions. il. Diffusion, compound formation, and microstructure, 1979 American Institute of Physics, pp. 6915-6922.

J. Baglin, et al., An Alternative marker experiment in the formation of Mo and W silicides, 1978 American Institute of Physics. pp. 289-290.

M. Bartur, et al., Electrical characteristics of Al contact to NiSl using thin W layer as a barrier,, 1981 American Institute of Physics, pp. 822-824.

Krishna C. Saraswat, et al., Properties of Low-Pressure CVD Tungsten Silicide for MOS VLSI Interconnections, 1983 IEEEZ, pp.

F. Mohammadl, et al.., Properties of Sputtered Tungsten silicide for MOS Integrated Circuit Applications. pp. 450-454.

Anderson, H.M., "Plasma Diagnostics for Semicondcutor Processing", 2000 Digest of the LEOS Topical Meetings (Jul. 24-28, 2000), pp. 117-118 (abstract only).

Baryshev et al., "Monitoring of XiO2/Si Plasma Etching and End-Point Detection", Mikroelektroniks (Russia), vol. 25, No. 5 (Sep./Oct. 1996), pp. 373-379 (abstract only).

Bassom et al., "Modeling and Optimizing XeF2-enhanced FIB Milling of Silicon", 25th International Symposium for Testing and Failure Analysis, Santa Clara, CA (Nov. 14-18, 1999), pp. 255-261 (abstract only).

Berg et al., "Real-Time Control of Etching Processes: Experimental Results", Proceedings of the SPIE—The International Society for Optical Engineering, vol. 3213 (1997), pp. 249-260 (abstract only).

Chambers et al., "Endpoint Uniformity Sensing and Analysis in Silicon Dioxide Plasma Etching Using In Situ Mass Spectrometry", J. Vac. Sci. Technol. B, Microelectron. Nanometer Struct., vol. 16, No. 6 (Nov./Dec. 1998), pp. 2996-3002 (abstract only).

Chan et al., "Gas Phase Pulse Etching of Silicon for MEMS with Xenon Difluoride", Engineering Solutions for the Next Millenium: 1999 IEEE Candian Conference on Electrical and Computer Engineering, Edmonton, Alberta, vol. 3 (May 9-12, 1999), pp. 1637-1642 (abstract only).

Chang et al., "Gas-Phase Silicon Micromachining with Silicon Difluoride", Proceedings of the SPIE—The International Socity for Optical Engineering, vol. 2641 (1995), pp. 117-128 (abstract only).

Chen et al., "Spatially Resolved Endpoint Detector for Plasma Etcher", 1997 IEEE International Symposium on Semiconductor Manufacturing Conference Proceedings, San Francisco, CA (Oct. 6-8, 1997), pp. B45-B48 (abstract only).

Chu et al., "Controlled Pulse-Etching with Xenon Difluoride", International Solid State Sensors and Actuators Conference (Transducers '97), Chicago, IL, vol. 1 (Jun. 16-19, 1997), pp. 665-668 (abstract only).

Heinrich et al., "Multichannel Process Monitor for Real-time Film Thickness and Rate Measurements in Dry Etching and Deposition", Vacuum, vol. 51, No. 4, (Dec. 1998), pp. 497-502 (abstract only).

Kohler et al., "Fabrication of Microlenses by Plasmaless Isotropic Etching Combined with Plastic Moulding", Sens. Actuators A. Phys. (Switzerland), vol. A53, No. 1-3 (May 1996), pp. 361-363 (abstract only).

Li et al., "Mass Spectometric Measurements on Inductively Coupled Fluorocarbon Plasmas: Positive Ions, Radicals and Endpoint Detection", J. Vac. Sci. Technol. A, Vac. Surf. Films, vol. 17, No. 5, (Sep. 1997), pp. 2438-2446 (abstract only).

Liamanond et al., "Production Data Based Optimal Etch Time Control Design for a Reactive Ion Etching Process", IEEE Trans. Semicond. Manuf., vol. 12, no. 1 (Feb. 1999), pp. 139-147 (abstract only).

Litvak, H.E., "End Point Control Via Optical Emission Spectroscopy", J. Vac. Sci. Technol. B, Microelectron. Nanometer Struct., vol. 14, No. 1 (Jan./Feb. 1996), pp. 516-520 (abstracts only).

Lu et al., "Effluent Monitoring with FTIR Spectroscopy for Low Open Area Oxide Etch Endpoint Detection", 8th International Symposium on Semiconductor Silicon, San Diego, CA, vol. 2 (May 4-8, 1998), pp. 1250-1261 (abstract only).

Maynard et al., "Plasma Etching of Submicron Devices: In Situ Monitoring and Control by Multi-Wavelength Ellipsometry", Thin Solid Films (Switzerland), vol. 313-314, No. 1-2 (Feb. 1998), pp. 398-405 (abstract only).

Melville et al., "Volatile Products and Endpoint Detection in Reactive Ion Etching of III-V Compounds with a Broad Beam ECR Source", Nuclear Instruments & Methods in Physics Research, Section B (Beam Interactions with Materials and Atoms), vol. B106, No. 1-4 (Dec. 1995), pp. 179-182 (abstract only).

Muthukumaran et al., "Gas-Phase Xenon Difluoride Etching of Microsystems Fabricated Through the Mitel 1.5-mu m CMOS Process", Can. J. Electr. Comput. Eng. (Canada), vol. 25, No. 1 (Jan. 2000), pp. 35-41.

Perrin, J. "Mass Spectrometry of Reactive Plasmas", Plasma Processing of Semiconductors, Chateau de Bonas, France (Jun. 17-28, 1996), pp. 397-431 (abstract only).

Richter et al., "Exhaust Gas Monitoring: New Window Into Semiconductor Processing", Solid State Technol., vol. 42, No. 5 (May 1999), pp. 61, 63-64, 68, 70-71 (abstract only).

Saito et al., "Low Temperature Plasmaless Etching of Silicon Dioxide Film Using Chlorine Trifluoride Gas with Water Vapor", J. Electrochem. Soc., vol. 147, No. 12 (Dec. 2000), pp. 4630-4632 (abstract only).

Sebel et al., "Etching of Si Through a Thick Condensed XeF2 Layer", J. Vac. Sci. Technol. A, Vac. Surf. Films, vol. 18, No. 5 (Sep./Oct. 2000), pp. 2090-2097 (abstract only).

Sebel et al., "Reaction Layer Dynamics in Ion-Assisted Si/XeF2 Etching: Temperature Dependence", J. Vac. Sci. Technol. A, Vac. Surf. Films, vol. 18, No. 6, (Nov. 2000), pp. 2759-2769 (abstract only).

Sebel et al., "Silicon Etch Rate Enhancement by Traces of Metal", J. Vac. Sci. Technol. A, Vac. Surf. Films, vol. 17, No. 3, (May/Jun. 1999), pp. 755-762 (abstract only).

Sugano et a., "Study on XeF2 Pulse Etching Using Wagon Wheel Pattern", Proceedings of the 1999 International Symposium on Micromechantronics and Human Science: Towards the New Century, Nagoya, Japan (Nov. 23-26, 1999), pp. 163-167 (abstract only).

Sun et al., "Sensitive Plasma Etching Endpoint Detection Using Tunable Diode Laser Absorption Spectroscopy", Appl. Phys. Lett., vol. 64, No. 21 (May 23, 1994), pp. 2779-2781 (abstract only).

Thomas et al., "Minimized Response Time of Optical Emission and Mass Spectrometric Signals for Optimized Endpoint Detection", J. Vac. Sci. Technol. B, Microelectron. Nanometer Struct., vol. 14, No. 4 (Jul./Aug. 1996), pp. 2531-2536 (abstract only).

Toda et al., "Thin Beam Bulk Micromachining Based on RIE and Xenon Difluoride Silicon Etching", International Solid State Sensors and Actuators Conference (Transducers '97), Chicago, IL, vol. 1 (Jun. 16-19, 1997), pp. 671-674.

Vugts et al., "Si/XeF2 Etching: Reaction Layer Dynamics and Surface Roughening", J. Vac. Sci. Technnol. A, Vac. Surf. Films, vol. 14, No. 5 (Sep./Oct. 1996), pp. 2780-2789 (abstract only).

Vugts et al., "Si/XeF2 Etching: Temperature Dependence", J. Vac. Sci. Technnol. A, Vac. Surf. Films, vol. 14, No. 5 (Sep./Oct. 1996), pp. 2766-2774 (abstract only).

Wan et al., "Electron Cyclotron Resonance Plasma Reactor for SiO2 Etching: Process Diagnostics, End-Point Detection, and Surface Characterization", J. Vac. Sci. Technol. A, Vac. Surf. Films, vol. 13, No. 4 (Jul./Aug. 1995), pp. 2035-2043 (abstract only).

Wang et al., "Gas-Phase Silicon Etching with Bromine Trifluoride", International Solid State Sensors and Actuators Conference (Transducers '97), Chicago, IL, vol. 2, (Jun 16-19, 1997), pp. 1505-1508 (abstract only).

Ward, P.P., "Plasma Process Control with Optical Emission Spectroscopy", 17th IEEE/CPMT International Electronics Manufacturing Technology Symposium: Manufacturing Technologies—Present and Future, Austin, TX (Oct. 2-4, 1995), pp. 166-169 (abstract only).

Warneke, et al., "In Situ Characterization of CMOS Post-Process Micromachining", Sens. Actuators A, Phys. (Switzerland), vol. A89, No. 1-2 (Mar. 20, 2001), pp. 142-151 (abstract only).

Welch et al., "Breaking the 0.5 Percent Exposed Area Etch Endpoint Barrier", Semicond. Int., vol. 19, No. 8 (Jul. 1996), pp. 269-270, 272, 274, 276 (abstract only).

Wodecki, N.D., Low Open Area Multi-Layered Dielectric Film Etch Endpoint Detection Using EndPoint Plus (TM), Proceedings of the SPIE—The International Society of Optical Engineering, vol. 3882 (1999), pp. 231-238 (abstract only).

Wong et al., "Endpoint Prediction for Polysilicon Plasma Etch Via Optical Emission Interferometry", J. Vac. Sci. Technol. A, Vac. Surf. Films, vol. 15, No. 3, Pt. 2 (May/Jun. 1997), pp. 1403-1408 (abstract only).

Yue et al., "Plasma Etching Endpoint Detection Using Multiple Wavelengths for Small Open Area Wafers", J. Vac. Sci. Technol. A, Vac. Surf. Films, vol. 19, No. 1 (Jan. 2001), pp. 66-75 (abstract only).

US 6,724,518, 04/2004, Meyer et al. (withdrawn)

* cited by examiner

MICROMIRROR ARRAY HAVING REDUCED GAP BETWEEN ADJACENT MICROMIRRORS OF THE MICROMIRROR ARRAY

CROSS-REFERENCE TO RELATED APPLICATIONS

The current application is a continuation of co-pending U.S. patent application Ser. No. 10/627,302 to Patel filed Jul. 24, 2003, which is a continuation-in-part of U.S. patent application Ser. No. 10/613,379 to Patel filed Jul. 3, 2003, now U.S. Pat. No. 6,873,450 the subject matter of each being incorporated herein by reference.

TECHNICAL FIELD OF THE INVENTION

The present invention is related generally to the art of microelectromechanical systems, and, more particularly, to micromirror array devices comprising a plurality of micromirror devices for use in display systems.

BACKGROUND OF THE INVENTION

The present invention relates to spatial light modulators having reflective micromirrors that are provided within a micromirror array for, e.g., projection-type displays (or for steering light beams, maskless lithography and maskless micro array production). A simplified such display system is illustrated in FIG. 1. In its very basic configuration, display system 100 comprises light source 102, optical devices (e.g. light pipe 104, condensing lens 106 and projection lens 108), display target 112 and spatial light modulator 110 that further comprises a plurality of micromirror devices (e.g. an array of micromirror devices). Light source 102 (e.g. an arc lamp) emits light through the light integrator/pipe 104 and condensing lens 106 and onto spatial light modulator 110. The micromirrors of the spatial light modulator 110 are selectively actuated by a controller (e.g. as disclosed in U.S. Pat. No. 6,388,661 issued May 14, 2002 incorporated herein by reference) so as to reflect—when in their "ON" position—the incident light into projection optics 108, resulting in an image on display target 112 (screen, a viewer's eyes, a photosensitive material, etc.). Generally, more complex optical systems, such as systems employing more than three spatial light modulators (each being designated for modulating one of the three primary colors—red, green and red) are often used, especially in displaying applications for color images.

It is often desirable for the display system to have a bright image. Brighter images are made possible by a number of factors, including the optical efficiency of the micromirror array itself (fill factor, diffraction, reflectivity of the mirrors, etc.) as well as the optical efficiency of the projection system (light source, light loss via filters and lenses, micromirror array optical efficiency, etc.). One way of increasing the brightness of a projection display is to use a shorter arc length arc lamp. For example, an arc length of 0.7 mm or 1.0 mm has a higher brightness than a lamp with an arc length of 1.3 mm or 1.6 mm, because the beam produced by smaller arc length lamps can be more easily passed through an optical system.

However, using an arc lamp in a projection system preferably utilizes a micromirror array with preferred dimension. In particular, for an arc lamp with a given arc length, it is desired for the spatial light modulator to have a large enough size—if the optical efficiency of the projection system (or more specifically, the optical coupling efficiency, to which the brightness of images produced by the spatial light modulator, of the light source to the array) is not to be degraded. A large spatial light modulator, however, is not cost-effective due to many factors, such as higher costs in manufacturing and optical elements (e.g. condensing and projection lenses). In practical design of the display system and the spatial light modulator, the cost-effectiveness and the optical efficiency need to be balanced—yielding an optimal size of the spatial light modulator.

The diameter of a micromirror array is proportional to the micromirror pitch (defined as the center-to-center distance between adjacent micromirrors) for a given resolution (defined as the number of micromirrors in the micromirror array) of the micromirror array. Given a spatial light modulator with optimum size, the micromirror pitch needs to be reduced if a higher resolution is desired. Because the mirror pitch is a summation of the gap between adjacent micromirrors and the size of the micromirror, reduction of the mirror pitch requires reduction of the gap between adjacent micromirrors if fill factor (the percentage of reflective area to total array size and measured by a ratio of the mirror size to the pitch) is not to be lost.

Therefore, what is needed is a spatial light modulator having an array of micromirror devices and a method of making such a spatial light modulator that allows for higher resolutions while maintain the same optimum size.

SUMMARY OF THE INVENTION

In the present invention, both designs of micromirror arrays of spatial light modulators and methods of making the same are provided. The spatial light modulators allow for micromirror arrays having smaller overall dimensions, while allowing for good resolution and optical efficiency. Moreover, the spatial light modulator allows for higher resolutions and optical efficiency while maintaining the same dimension of the micromirror array. In a number of embodiments of the invention, micromirror arrays are constructed having a pitch of 10.16 micrometers or less. In other embodiments, micromirror array designs include micromirror arrays having a gap between adjacent micromirrors of 0.5 micrometers or less, and in other embodiments the gap is from 0.1 to 0.5 micrometer. In yet other embodiments, micromirrors are constructed that do not have symmetric ON and OFF positions. In still further embodiments, methods for making mirror arrays utilize spontaneous gas phase chemical etchants to provide mirrors having smaller than usual dimensions.

In an embodiment of the invention, a method is disclosed. The method comprises: depositing a first sacrificial layer on a substrate; forming an array of mirror plates on the first sacrificial layer, wherein a gap between the adjacent mirror plates of the mirror plate array is from 0.15 to 0.5 micrometers; depositing a second sacrificial layer on the mirror plates with a thickness from 0.5 to 1.5 micrometers; forming a hinge support on the second sacrificial layer for each mirror plate for supporting the mirror plate; and removing at least a portion of one or both of the first and the second sacrificial layers using a spontaneous vapor phase chemical etchant.

In another embodiment of the invention, a spatial light modulator is disclosed. The spatial light modulator comprises: an array of mirror devices formed on a substrate for selectively reflecting light incident on the mirror devices, wherein each mirror device comprises: a mirror plate for reflecting light; a hinge attached to the mirror plate such that the mirror plate can rotate relative to the substrate, wherein the hinge and the mirror plate are spaced apart from 0.5 to 1.5 micrometers; and a hinge support on the substrate for holding the hinge on the substrate; and wherein the adjacent mirror plates have a gap from 0.15 to 0.5 micrometers.

In yet another embodiment of the invention, a spatial light modulator is disclosed. The spatial light modulator comprises: an array of movable mirror plates formed on a substrate for selectively reflecting a light beam incident on the mirror plates, wherein adjacent mirror plates have a gap from 0.15 to 0.5 micrometers when the adjacent mirror plates are parallel to the substrate.

In yet another embodiment of the invention, a projector is disclosed. The projector comprises: a light source; a spatial light modulator that further comprises: an array of mirror devices formed on a substrate for selectively reflecting light incident on the mirror devices, wherein each mirror device comprises: a mirror plate for reflecting light; a hinge attached to the mirror plate such that the mirror plate can rotate relative to the substrate, wherein the hinge and the mirror plate are spaced apart from 0.5 to 1.5 micrometers; a hinge support on the substrate for holding the hinge on the substrate; and wherein adjacent mirror plates has a gap from 0.15 to 0.5 micrometers; and a condensing lens for directing light from the light source onto the spatial light modulator; and a projecting lens for collecting and directing light reflected from the spatial light modulator onto a display target.

In yet another embodiment of the invention, a projector is disclosed. The projector comprises: a light source; and a spatial light modulator that further comprises: an array of movable mirror plates formed on a substrate for selectively reflecting a light beam incident on the mirror plates, wherein adjacent mirror plates have a gap from 0.15 to 0.5 micrometers when the mirror plates are parallel to the substrate.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

FIG. 6b schematically illustrates another minimum gap defined by two adjacent mirror plates that rotate symmetrically, wherein the distance between the mirror plate and the hinge is less than that in FIG. 6a;

FIG. 8b illustrates a micromirror device of the micromirror array of FIG. 8a;

FIG. 9b illustrates a micromirror device of the micromirror array of FIG. 9a;

DETAILED DESCRIPTION OF THE EMBODIMENTS

In the present invention, both designs of micromirror arrays of spatial light modulators and methods of making the same are provided. The spatial light modulators allow for micromirror arrays having smaller overall diameters, while allowing for good resolution and optical efficiency. Moreover, the spatial light modulator allows for higher resolutions and optical efficiency while maintaining the same overall dimensions of the micromirror array of the spatial light modulator.

According to the invention, the light source of the display system is an arc lamp with a short arc length preferably 1.6 millimeters or less, more preferably 1.3 millimeters or less, more preferably 1.0 millimeters or less. The power of the arc lamp is preferably from 100 watts to 250 watts.

Figure 2:
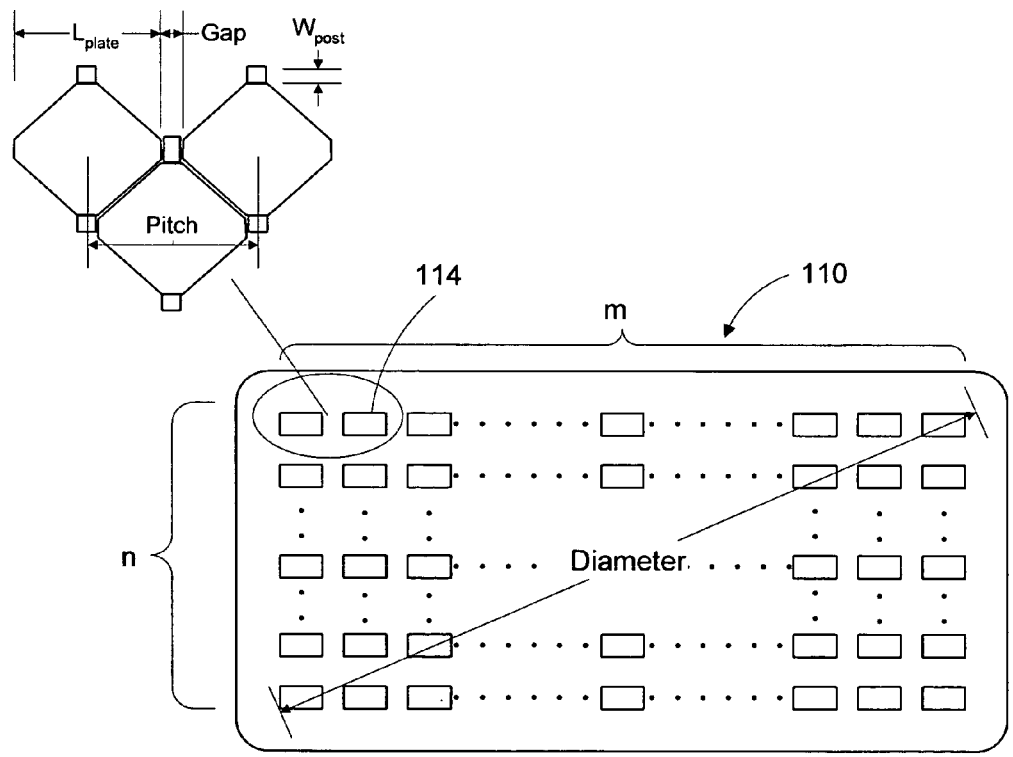
FIG. 2 is illustrates a exemplary spatial light modulator having an array of micromirrors.

The dimension of the micromirror array and the spatial light modulator is defined with reference FIG. 2. Spatial light modulator 110 comprises an array of micromirrors that has m×n micromirrors (e.g. micromirror device 114), wherein m and n respectively represent the number of micromirror devices in a row and a column of the array. The micromirror array also has a well defined diagonal, which is generally measured in inches. As shown in the insert figure, a gap and pitch is defined by two adjacent micromirrors. $L_{plate}$ measures the size of the micromirror, and $W_{post}$ measures the post area of the micromirror. The post area is the area in which posts (e.g. post 219 in FIG. 8b and FIG. 9b) for holding the mirror plate are formed. Though the insert figure illustrates the dimensions of the micromirror and the adjacent micromirrors with the micromirror of rectangular shape, those dimension definitions are applicable to any micromirrors and micromirror arrays.

Figure 3:
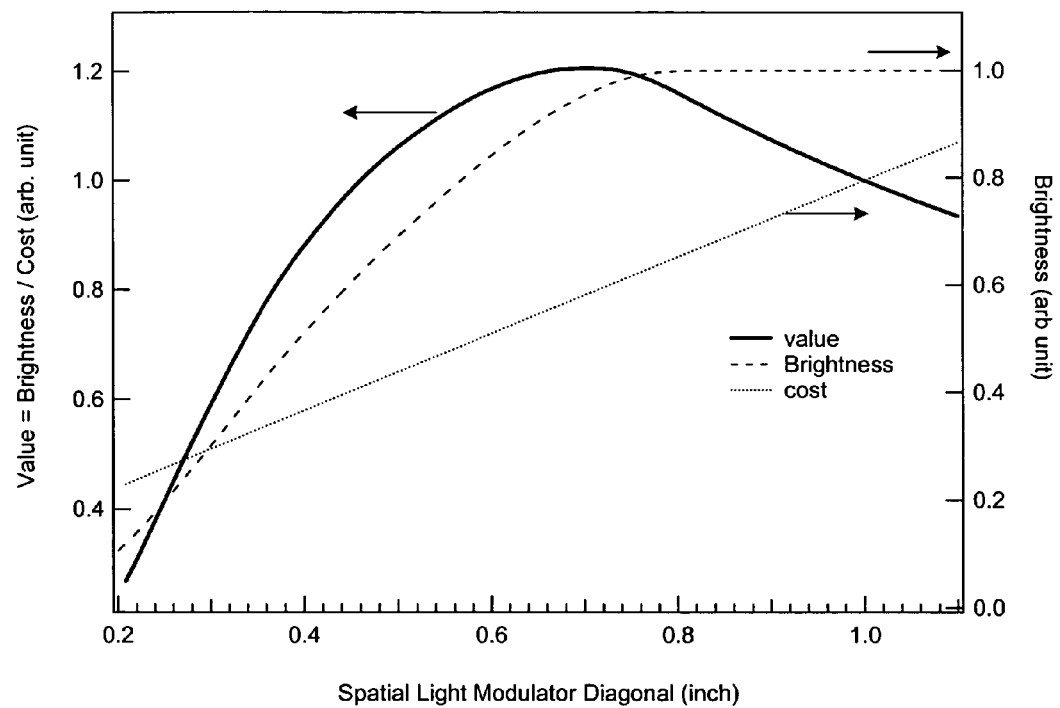
FIG. 3 is a diagram schematically showing the brightness of the produced images by the micromirror array, the cost of fabricating the micromirror array and the value (defined as the brightness per cost) versus the diameter of the micromirror array.

To be compatible with an arc lamp as the light source of the display system, while satisfying the cost-effectiveness requirement, an optimum diameter is determined for the micromirror array of the spatial light modulator. For example, in a display system using an arc lamp with an arc length around 1.0 mm, the brightness of images produced by the spatial light modulator modulating light from the arc lamp, the cost of spatial light modulator and value (defined as the brightness per cost) versus the overall diameter of the spatial light modulator are illustratively plotted in FIG. 3. Referring to FIG. 3, brightness and cost are respectively plotted in dash-line and dotted-line with reference to the Y axis on the right side. The value is plotted in solid-line with reference to Y axis on the left side. As can be seen from the figure, brightness increases with the diameter of the micromirror array increasing and saturates after the diameter of the micromirror array is around 0.8 inch. As a simple approximation, the cost is linearly proportional to the diameter of the micromirror array. The value, defined as the brightness per cost, varies with the diameter of the micromirror array and presents a maximum value when the diameter is around 0.7 inch. According to the invention, the diameter of the micromirror array is preferably from 0.55 inch to 0.8 inch, more preferably from 0.65 to 0.75 inch, and more preferably around 0.7 inch.

Given the diameter of a micromirror array within a spatial light modulator, the pitch (defined as the center-to-center distance between adjacent micromirrors) of the micromirror array depends upon the resolution of the micromirror array, which can be expressed as:

$$\text{Pitch} = \frac{\text{Diameter}}{\sqrt{m^2 + n^2}} \quad \text{(Eq. 1)}$$

Figure 4:
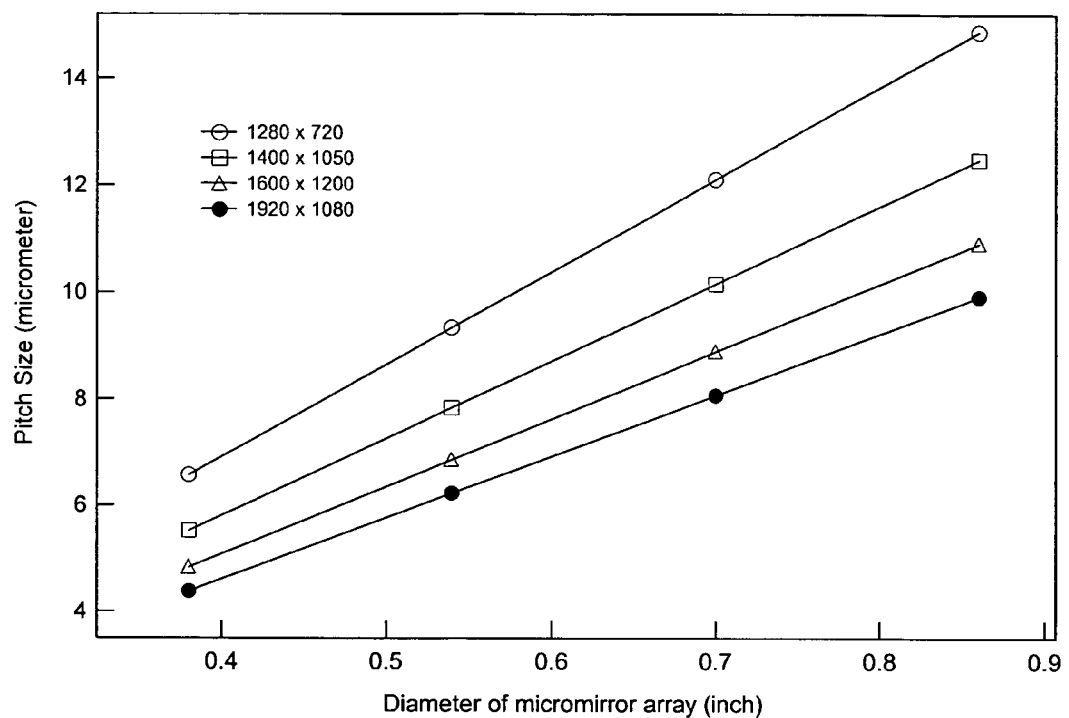
FIG. 4 plots the variation of the pitch size with the diameter of the micromirror array at different resolutions.

FIG. 4 illustrates the variation of the pitch versus diameter of the micromirror array at different resolutions. Referring to FIG. 4, open circles, open squares, open triangles and solid circles respectively represents resolutions of 1280×720, 1400×1050, 1600×1200 and 1920×1080. It can be seen from the plot that, when the diameter is around 0.38 inch, the optimum pitch sizes are from 4.38 to 6.57 μm with the resolution varying from 1920×1080 to 1280×720. When the diameter of the micromirror array is around 0.54 inch, the optimum pitch sizes are from 6.23 to 9.34 μm with the resolution varying from 1920×1080 to 1280×720. When the diameter of the micromirror array is around 0.7 inch, the optimum pitch sizes are from 8.07 to 12.11 μm with the resolution varying from 1920×1080 to 1280×720. And when the diameter of the micromirror array is around 0.86 inch, the optimum pitch sizes are from 9.92 to 14.87 μm with the resolution varying from 1920×1080 to 1280×720.

Figure 5:
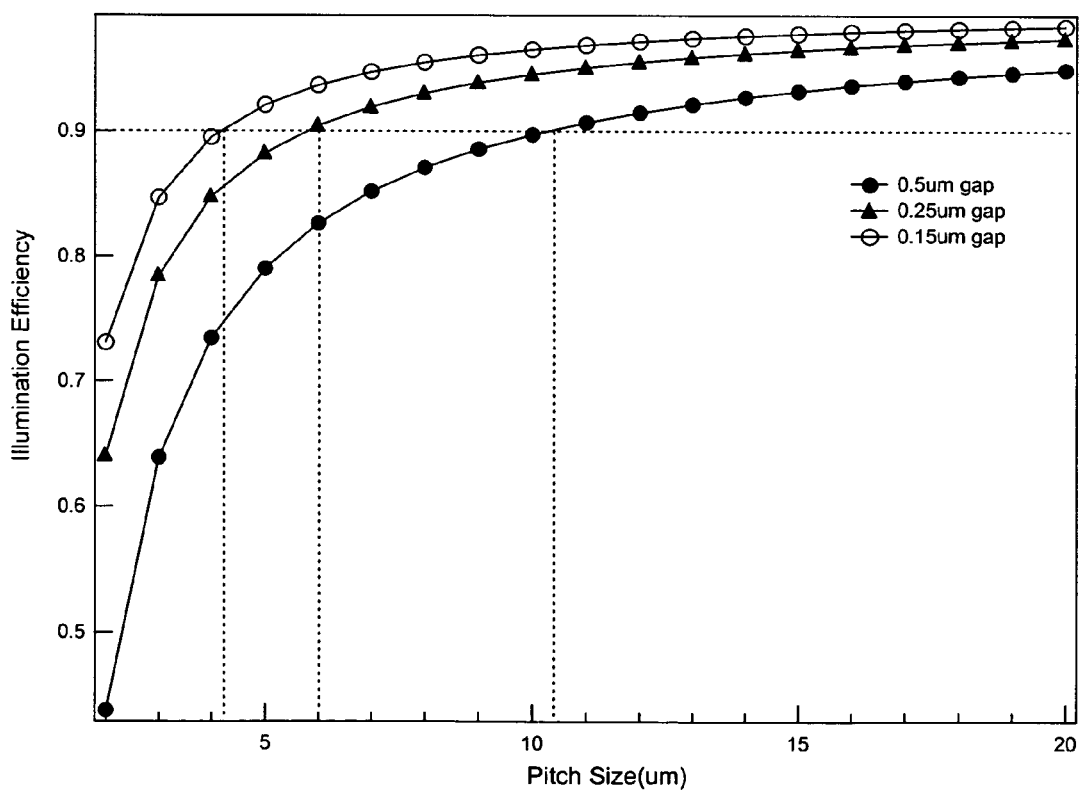
FIG. 5 plots the variation of the illumination efficiency of the micromirror array device with the pixel pitch.

The diameter of the micromirror array depends upon two dimensional parameters—the diagonal of the mirror plate ($L_{plate}$) of the micromirror and the gap between adjacent micromirrors, as defined in FIG. 2. Of the two parameters, the gap degrades the optical efficiency of the micromirror in reflecting light. This type of degradation can be analyzed in terms of illumination efficiency, which is defined as the ratio of the total effective reflective area to the total area of the micromirror array. Specifically, the illumination efficiency (eff) can be expressed as:

$$\text{eff} = \frac{(\text{pitch} - \text{gap})^2 - 2 \times W_{post}^2}{\text{pitch}^2} \quad \text{(Eq. 2)}$$

wherein the term $(\text{pitch}-\text{gap})^2 - 2 \times W_{post}^2$ is the total effective reflection area of the micromirrors of the micromirror array, and pitch² is the total area of the micromirrors of the micromirror array. FIG. 5 plots the illumination efficiency versus the pitch size with the post having a fixed size ($W_{post}$=1.0 μm) and the gap having a size of 0.5 μm, 0.25 μm and 0.15 μm. Specifically, the line with solid triangles, the line with solid circles and the line with solid circles respectively plot the dependency of the illumination efficiency upon the pixel pitch when the gap is 0.25 μm, 0.5 μm and 0.15 μm, and the post size is 0.5 μm. From the figure, it can be seen that when the gap is around 0.25 μm, the pitch size of the micromirror array is at least 4.38 μm so as to obtain the illumination efficiency higher than 85%. And when the gap is around 0.5 μm, the pitch size of the micromirror array is at least 8.07 μm so as to obtain the illumination efficiency higher than 85%. If the illumination efficiency is desired to be higher than 90%, the pitch size is at least 4.38 μm, 6.23 μm and 10.16 μm when the gap size is around 0.15 μm, 0.25 μm and 0.5 μm, respectively. In the present invention, the pitch size of the micromirror array device is preferably from 4.38 μm to 10.16 μm, preferably from 4.38 μm to 9.341 μm, and preferably from 4.38 μm to 6.57 μm, and preferably from 6.231 μm to 9.34 μm, and more preferably from 8.07 μm to 10.16 μm. It is also preferred that the gap between adjacent micromirrors is 0.5 μm or less, more preferably, from 0.25 μm to 0.5 μm, and more preferably from 0.15 μm to 0.25 μm.

As discussed above, in view of the optical efficiency and cost-effectiveness of the display system, the micromirror array within the spatial light modulator of the display system has an optimum diameter. For a micromirror array with the optimum diameter, it is desired to reduce the pitch size of the micromirror array in order to accommodate more micromirrors-achieving higher resolutions. Because the pitch is a summation of the length of the micromirror and the gap between adjacent micromirrors, the reduction of the pitch can be achieved by either reducing the micromirror size or the gap between adjacent micromirrors. Reduction of the micromirror size without reducing the gap size, however, damages the illumination efficiency of the micromirror array, as discussed with reference to FIG. 5. Therefore, reduction of the gap, as well as reduction of the mirror size, is also preferred in achieving higher resolution for a micromirror array with the given optimum diameter. Though reduction of the pitch can be achieved by reducing the gap size and the mirror size, the gap size and the mirror size do not have to both be reduced. In particular, reduction of the gap is preferred to achieve a small pitch if it is achievable. If the desired small pitch is not achievable by reducing the gap only, mirror size is reduced.

In order to allow for reduction of the gap between adjacent micromirrors of the micromirror array, the micromirror of the present invention is designed such that the mirror plate of the micromirror rotates asymmetrically along a rotation axis, because asymmetric rotation allows for a smaller gap than the symmetric rotation. Moreover, the distance between the mirror plate and the rotation axis is as small as compared to the distance between the mirror plate and the substrate on which the mirror plate is formed. Detailed embodiments will be discussed in the following with reference to FIG. 6a, FIG. 6b and FIG. 6c. As an optional feature of the invention, such asymmetry aids in achieving smaller pitch and gap micromirror arrays without adjacent micromirrors impacting each other.

Figure 6A:
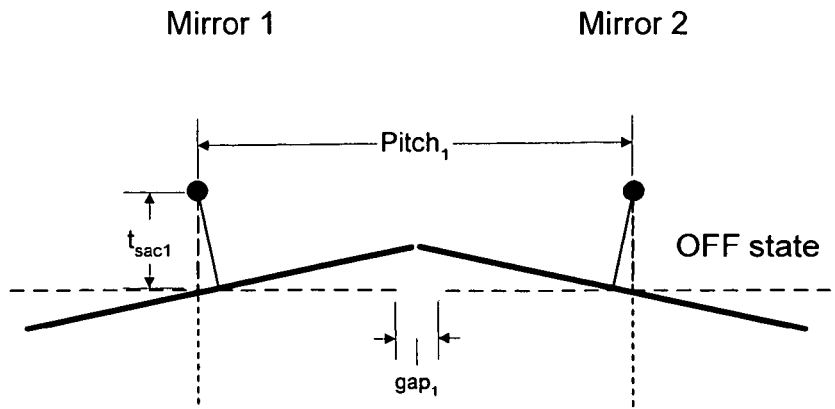
FIG. 6a schematically illustrates a minimum gap defined by two adjacent mirror plates that rotate symmetrically.

FIG. 6a illustrates a cross-sectional view of two adjacent micromirrors, each rotating symmetrically. The solid dark circle in each micromirror represents the rotation axis of the mirror plate. Pitch₁ measures the pitch (equal to the distance between the two rotation axes) between the adjacent micromirrors. $t_{sac}$ is the distance between the mirror plate and the rotation axis. The trajectory of the ends of each mirror plate is plotted in dotted circle. The micromirror 2 is fixed and its mirror plate is rotated clockwise to the OFF state angle corresponding to the OFF state of the micromirror. The micromirror 1 can be fabricated to be closer or further away from micromirror 2. And the pitch₁ is thus variable. In the figure, the micromirror 1 is placed at a position such that during the counter-clockwise rotation of the mirror plate of the micromirror 1 towards the ON state angle, the "right" end of the mirror plate is tangent but without impacting to the "left" end of the mirror plate of the micromirror 2. From this situation, $gap_1$ is defined by the two mirror plates of the two adjacent micromirrors when they are "flat" (e.g. parallel to the substrate or non-deflected).

Figure 6B:
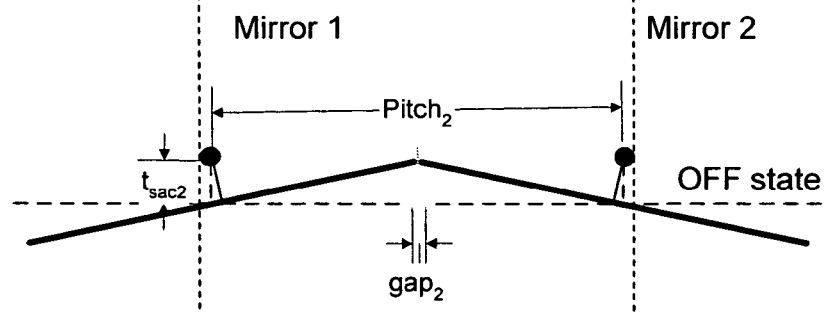

FIG. 6b illustrates a cross-sectional view of two adjacent micromirrors, each rotating symmetrically, while the distance $t_{sac2}$ between the mirror plate and the rotation axis is smaller than that in FIG. 6a, that is $t_{sac2}<t_{sac1}$. By comparing the gaps and pitches in FIG. 6a and FIG. 6b, it can be seen that $gap_2<gap_1$, and $pitch_2<pitch_1$. That is, the smaller $t_{sac2}$ allows for a smaller gap and smaller pitch micromirror array.

Figure 6C:
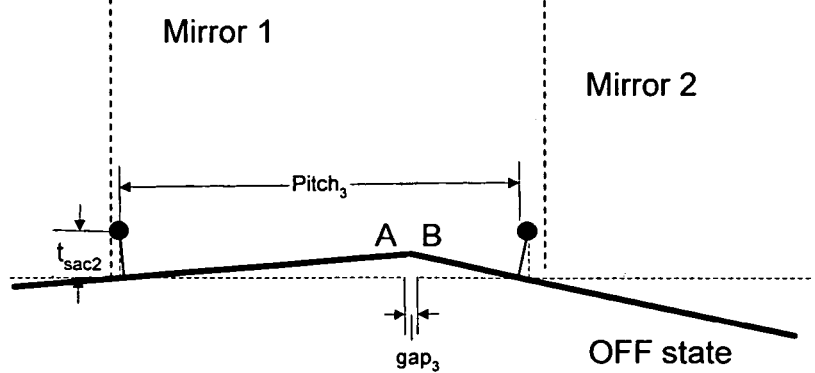
FIG. 6c schematically illustrates yet another minimum gap defined by two adjacent mirror plates that rotate asymmetrically, wherein the distance between the mirror plate and the hinge is the same as that in FIG. 6b.

The gap and the pitch between adjacent micromirrors in FIG. 6b can be made even smaller by attaching the mirror plate to the hinge asymmetrically, as shown in FIG. 6c. Referring to FIG. 6c, a cross-sectional view of two adjacent micromirrors, each being attached to the hinge such that he mirror plate rotates asymmetrically along the rotation axis, is illustrated therein. Specifically, each mirror plate is attached to the hinge, and the attachment point is positioned closer to one end of the mirror plate than the other. For example, the attachment point of the mirror plate of the micromirror 1 is positioned away from the "right" end A of the mirror plate. And the attachment point of the mirror plate of the micromirror 2 is positioned towards the "left" end B of the micromirror 2. The mirror plates are otherwise identical to those in FIG. 6a and FIG. 6b (e.g. the distance between the mirror plate and the rotation axis in FIG. 6c is the same as that in FIG. 6b). The trajectories of the end A and end B of the mirror plates are plotted in dotted circles. Because the rotations of the mirror plates along their rotation axes are asymmetrical, the trajectory circles of the end A and end B are different. By comparing the gaps and the pitches in FIG. 6b and FIG. 6c, it can be seen that $gap_3$ and $pitch_3$ in FIG. 6c are smaller than those in FIG. 6b and FIG. 6a. In particular, $gap_3<gap_2<gap_1$, and $pitch_3<pitch_2<pitch_1$. Though a small distance between the mirror plate and the rotation axis and an asymmetric rotation are not required in the present invention, they aid in the ability to achieve small pitch and small gap micromirror arrays—particularly at the lower ends of the dimension ranges in the present invention.

Figure 1:
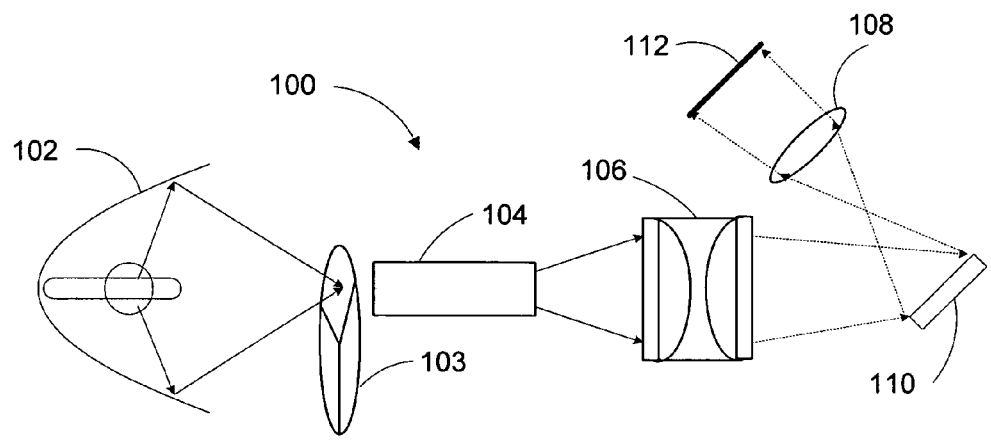
FIG. 1 diagrammatically illustrates an exemplary display system employing a spatial light modulator.
Figure 7:
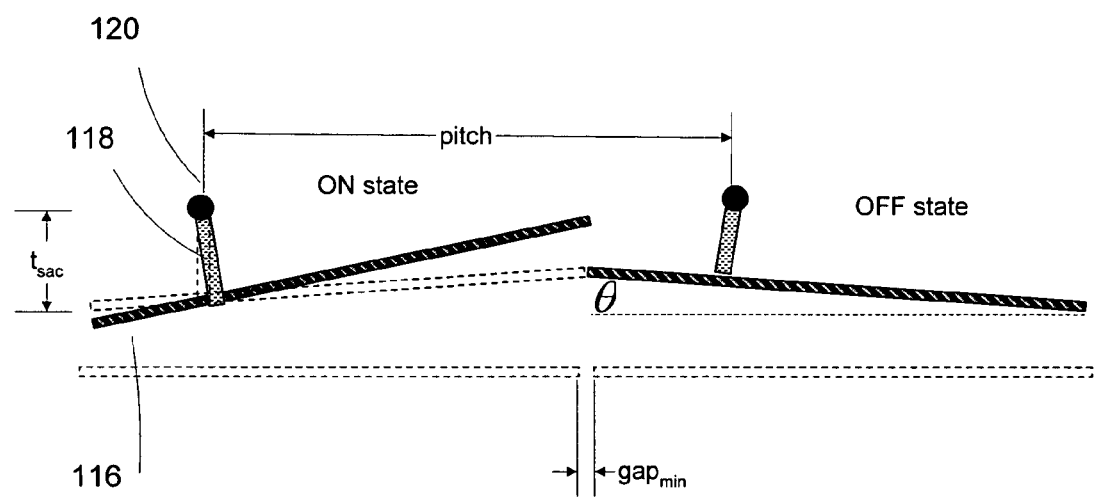
FIG. 7 is a cross-section view of two adjacent micromirrors illustrating the relative rotational positions of two adjacent mirror plates when one micromirror is at the OFF state and the other one at the ON state.

Referring to FIG. 7, a cross-sectional view of two adjacent micromirrors is illustrated therein. The mirror plates (e.g. mirror plate 116) of the micromirrors each rotates asymmetrically along a rotation axis. Specifically, the mirror plate (e.g. mirror plate 116) is attached to a hinge (e.g. hinge 120) via a hinge contact (e.g. hinge contact 118). The distance between the mirror plate and the hinge is denoted by $t_{sac}$. As can be seen from the figure, the mirror plate is attached to the hinge asymmetrically. Specifically, the attachment point of the mirror plate to the hinge contact is extended towards one end of the mirror plate so as to enabling the mirror plate to rotate asymmetrically to an ON state or an OFF state. The ON state is defined as a state wherein light reflected by the mirror plate is collected by the projection lens (e.g. projection lens 108 in FIG. 1) and generating a "bright" pixel of an image on the display target (e.g. display target 112 in FIG. 1). The OFF state is defined as a state wherein light is reflected by the mirror plate away from the projection lens—resulting in a "dark" pixel on the display target.

The ON state angle and the OFF state angle affect the quality of the produced image, such as the contrast ratio of the image. To obtain a high contrast ratio, a large ON state angle corresponding to the ON state and a non-zero OFF state angle corresponding to the OFF state are preferred. Specifically, it is preferred than the ON state angle is from 12° degrees to 18° degrees, and the OFF state angle is from −2° degrees to −8° degrees, wherein the "+" and "−" signs represent opposite rotation directions of the mirror plate as shown in the figure.

The ON state rotation angle and the OFF state rotation angle are achieved by applying an electrostatic force to the mirror plate and providing stop mechanisms for stopping the rotation of the mirror plates when the mirror plate rotates to the ON state angle or the OFF state angle. For example, the stop mechanism can be a substrate (e.g. substrate 210 in FIG. 8b) on which the mirror plate is formed or designated stops (e.g. stop 216 in FIG. 8b). In either case, a small distance between the mirror plate and the hinge is desired to benefit large rotation angle for the ON state and a small rotation angle for the OFF state. According to the invention, the distance between the mirror plate and the hinge is preferably from 0.15 to 0.45 micrometers, e.g. from 0.15 to 0.25 micrometers, or from 0.25 to 0.45 micrometers. Larger distance between the mirror plate and the hinge could also be used, such as a distance from 0.5 to 1.5 micrometers, or from 0.5 to 0.8 micrometers, or from 0.8 to 1.25 micrometers, or from 1.25 to 1.5 micrometers.

Figure 8A:
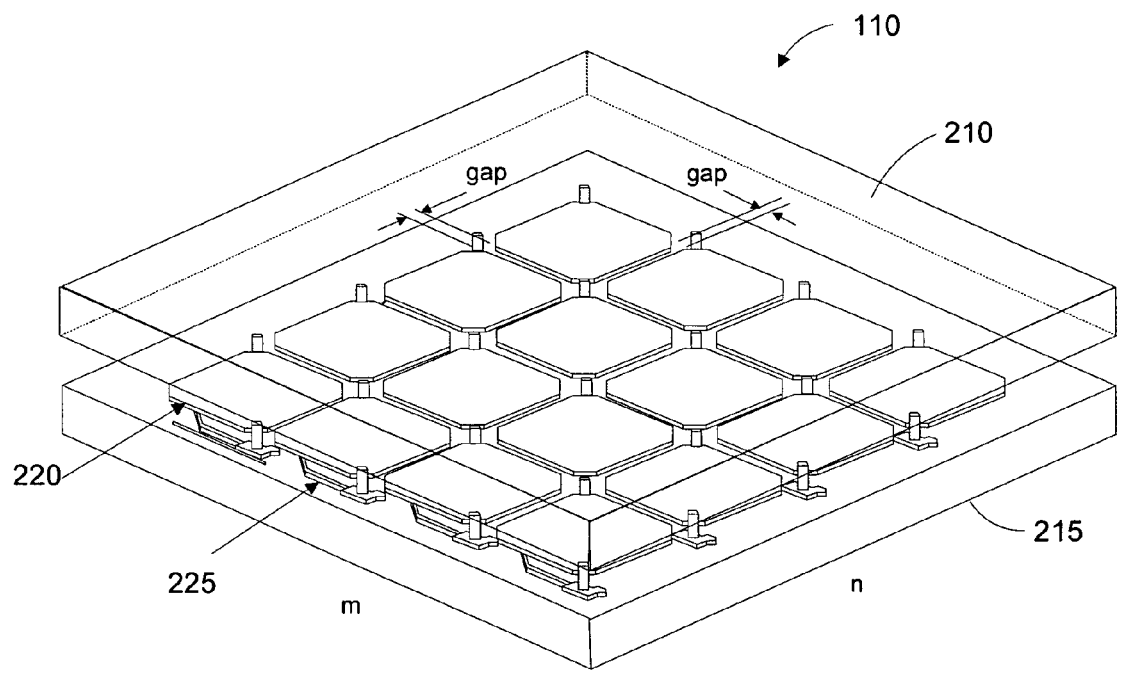
FIG. 8a illustrates an exemplary micromirror array according to an embodiment of the invention.

Referring to FIG. 8a, an exemplary micromirror array device 110 is illustrated therein. The micromirror array device comprises m×n micromirrors, wherein m and n respectively represents the number of micromirrors in a row and the number of micromirrors in a column of the array. The values of m and n determine the resolution of the displayed images. In the embodiment of the invention, the m×n are preferably 1280×720, 1400×1050, 1600×1200, 1920×1080, 2048×1536 or higher. Adjacent micromirrors in a row or a column of the micromirror array define a gap therebetween. The gap determines the fill factor of the micromirror array device, wherein the fill factor is defined as the ratio of the total area of the mirror plates of the micromirrors to the area of the micromirror array. For example, the fill factor can be calculated by: the area of a micromirror plate of the micromirror divided by the pitch squared, provided that the mirror plates of the micromirrors are identical and the pitch size is uniform over the entire micromirror array. In an embodiment of the invention, the fill factor of the micromirror array device is 85% or higher, and more preferably, 90% or higher. Proximate to micromirror array 220, electrode array 225 is disposed for selectively actuating the micromirrors. For example, an electrostatic field is established between the selected micromirror and the electrode disposed proximate to and designated for rotating the selected micromirror. In response to the electrostatic field, the micromirror rotates relative to substrate 210 to either an ON state or an OFF state (if the OFF state is defined as the micromirror having an angle with substrate 210) such that light incident onto the selected micromirror through substrate 210 can be reflected either into or away from a projection lens (e.g. projection lens 108 in FIG. 1a).

In this particular example, the micromirrors are formed on substrate 210, such as quartz or glass that is transmissive to visible light. And the electrode array is formed on substrate 215, which is a standard semiconductor wafer. In addition to the electrode array, a circuit array, such as a DRAM or SRAM array is also formed on substrate 215. Each circuit maintains a voltage signal and is connected to one electrode such that the voltage of the electrode is defined by the voltage signal in the circuitry. In this way, the electrostatic field between the mirror plate and the electrode is controlled by the circuit.

Figure 8B:
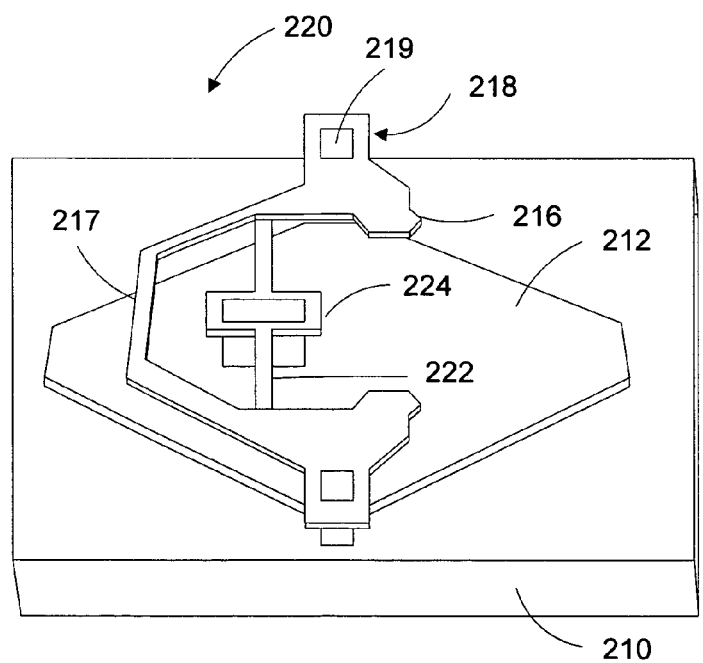

FIG. 8b schematically illustrates a back-view of a micromirror of micromirror array 110. As can be seen, the micromirror comprises mirror plate 212, hinge 222, hinge contact 224 and hinge support 218. The mirror plate is connected to the hinge through the contact. And the hinge is affixed to the hinge support that is formed on substrate 210. It is noted that the mirror plate is attached to the hinge such that the mirror plate can rotate relative to the substrate along a rotation axis that is parallel to but offset from a diagonal of the mirror plate when viewed from the top of the substrate. By "parallel to but offset from the diagonal", it is meant that the axis of rotation can be exactly parallel to or substantially parallel to (±19 degrees) the diagonal of the micromirror but offset from the diagonal when viewed from the above. With this configuration, the mirror plate is able to rotate asymmetrically along the rotation axis in two opposite rotation directions and achieves a large ON state angle compared to the ON state angles achieved by those micromirrors rotating symmetrically. In the present invention, the ON state angle is preferably +12° degrees or more, preferably +16° degrees or more, preferably +18° degrees or more and more preferably +20° degrees or more. And the OFF state angle is preferably from –10 degree to –80 degrees, and preferably around –40 degrees. In addition to the hinge and the contact, other features may also be formed on the hinge support. For example, stops 216 and 217 can be formed on the hinge support for stopping rotations of the mirror plate when the mirror plate achieves the ON state and OFF state angles. Specifically, stop 216 and stop 217 are respectively designated for stopping the mirror plate in rotating in a direction towards the ON state and in another direction towards the OFF state. By properly setting the length and the positions of the mirror stops and the distance between the mirror plate and the hinge, the ON state angle and the OFF state angle of all micromirrors can be uniformly achieved. The uniform OFF state angle and the ON state angle certainly improves the quality of performance of the micromirror array device. The qualities of the displayed images are improved.

The mirror plate rotates in response to an electrostatic field between the mirror plate and the electrode associated with the mirror plate. Specifically, an electrode is associated with the mirror plate for driving the mirror plate to rotate to the ON state. When the OFF state of the micromirror corresponds to a non-zero OFF state angle, a separate electrode (not shown) can be provided. The second electrode can be placed in any suitable location as along as it drives the mirror plate to rotate to the non-zero OFF state angle. For example, the second electrode can be placed on the same substrate as the first electrode for the ON state is disposed, but at a location on the opposite side of the rotation axis of the mirror plate. For another example, the second electrode can be disposed on the opposite side of the mirror plate in relation to the first electrode for the ON state. Alternative to forming the second electrode on the same substrate as the first electrode for the ON state being formed, the second electrode can be formed on the glass substrate, on which the micromirrors are formed. In this case, the second electrode is preferably an electrode grid, or electrode frame (or segments, such as stripes) below each micromirror. The second electrode can also be formed as an electrode film on the surface of the glass substrate, in which case, the electrode film is transparent to visible light. In addition to being used as electrode for driving the mirror plate to rotate, the second electrode on the glass substrate can also be used as light absorbing grid (or frame or segments) or anti-reflection film. Alternatively, the OFF state corresponding to the non-zero OFF state angle can be achieved without the second electrode. For example, a portion of the hinge structure can be made such that the portion is curved away from parallel to the substrate at the natural resting state. The mirror plate, which is attached to the curved portion present an angle to the substrate at the natural resting state.

Figure 9A:
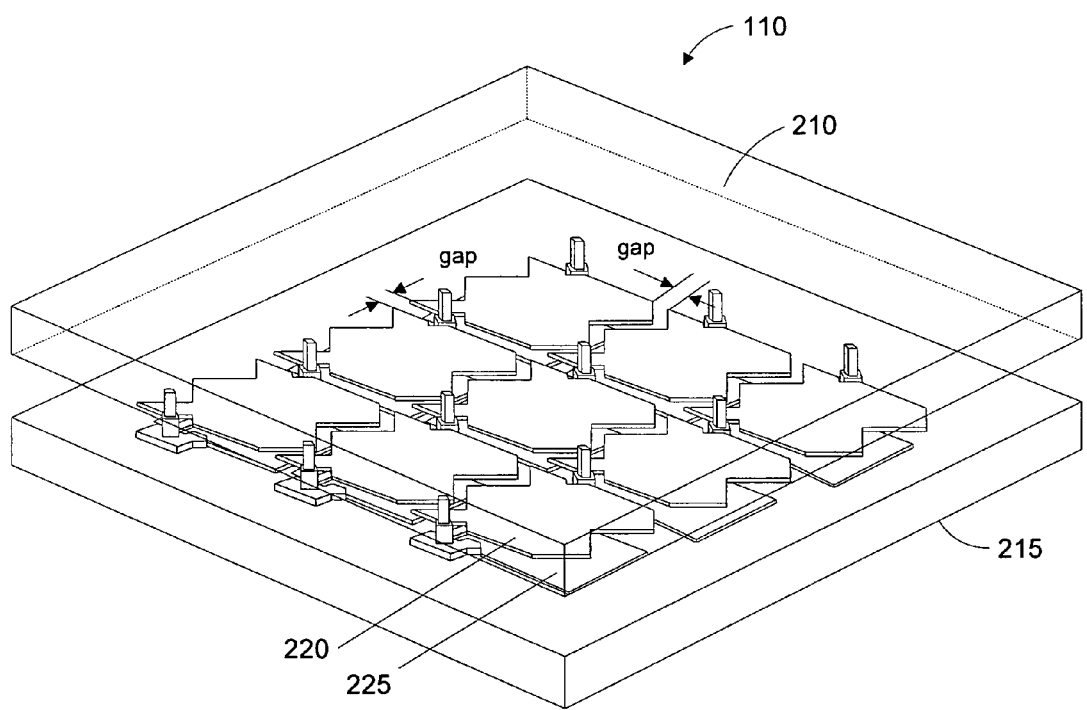
FIG. 9a illustrates another exemplary micromirror array according to an embodiment of the invention.
Figure 9B:
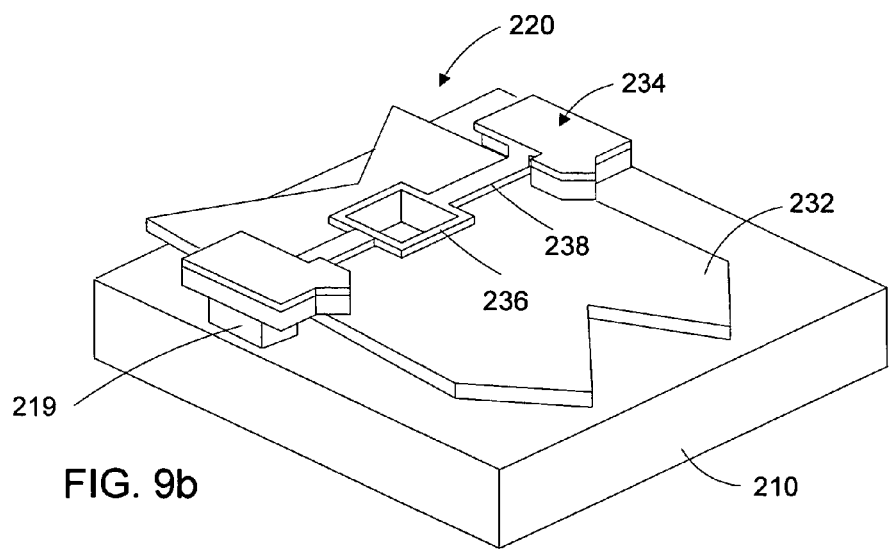

Referring to FIG. 9a and FIG. 9b, another exemplary micromirror array device and micromirror are illustrated therein. As seen in FIG. 9b, the shape of the mirror plate, shape of the hinge structure and relative arrangement of the mirror plate and the hinge structure of the micromirror are different from those in FIG. 8. In fact, the micromirror and the micromirror array of the micromirror array device can take many suitable forms. For example, the micromirrors and the electrodes of the micromirror array device can be formed on the same substrate (e.g. substrate 210 in FIG. 9a). And more than one electrode can be disposed proximate to each micromirror for rotating the mirror plate of the micromirror. In this case, at least one electrode is designated for driving the mirror plate to rotate in a first rotational direction, and at least another electrode is designated for driving the mirror plate to rotate in a second rotational direction that is opposite to the first rotation direction.

There is a variety of ways to construct the micromirror device described above, such as the fabrication methods disclosed in U.S. Pat. Nos. 5,835,256 and 6,046,840 both to Huibers, the subject matter of each being incorporated herein by reference. Regardless of the fabrication process, sacrificial materials are deposited between structures of the micromirrors and removed afterwards. For example, a sacrificial material is deposited between the mirror plate and the hinge to which the mirror plate is attached. The order of the fabrication steps for the mirror plate and the hinge depends upon the selected fabrication process and other factors, such as substrate. In particular, the mirror plate can be fabricated before the hinge, and alternatively, it can be fabricated after the hinge. For example, when the substrate is a silicon wafer, the hinge is fabricated before the mirror plate on the silicon wafer. For another example, when a glass substrate that is transmissive to visible light is used, the mirror plate is then fabricated before fabricating the hinge on the glass substrate. The sacrificial material also fills the space, such as gaps between adjacent micromirrors of the micromirror array. Removal of those sacrificial materials, however, is not a trivial process. As discussed earlier, the size of the gap between the hinge and the mirror plate is preferably from 0.15 to 0.45 microns, although the distance between the mirror plate and the hinge can be 0.15 to 1.5 microns according to the present invention. In order to efficiently remove sacrificial materials between the structures of the micromirrors, a spontaneous vapor phase chemical etching process is employed, which will be described in the following discussion on an exemplary fabrication process.

A demonstrative fabrication process for making the micromirror and the micromirror array device of the present invention will be discussed in the following with references to FIG. 10a through FIG. 10c. U.S. patent application Ser. No. 09/910,537 filed on Jul. 20, 2001 and 60/300,533 filed on Jun. 22, 2001 both to Reid contain examples of the materials that may be used for the various components of the present invention. These patent applications are also incorporated herein by reference. It should be appreciated by those of ordinary skill in the art that the exemplary processes are for demonstration purpose only and should not be interpreted as limitations. In particular, although not limited thereto, the exemplary micromirror is formed on a glass substrate that is transparent to visible light. And electrode and circuitry are formed on a separate substrate, such as a silicon wafer. Alternatively, the micromirror and the electrode and circuitry can be formed on the same substrate.

Figure 10A:
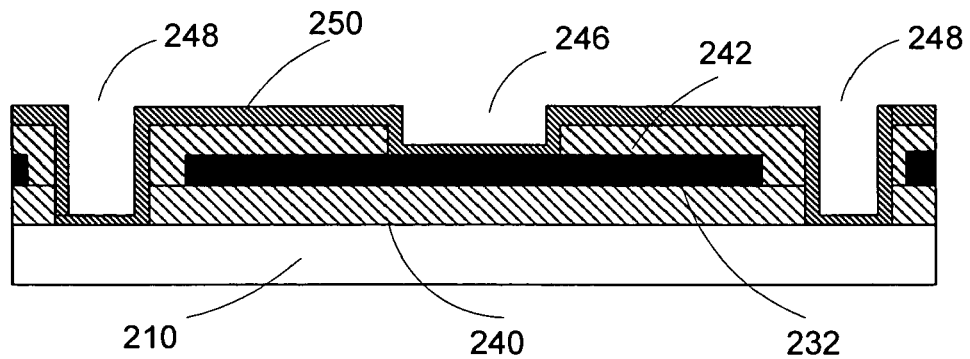
FIGS. 10a through 10c are cross-sectional view of the micromirror during an exemplary fabrication process.

Referring to FIG. 10a, a cross-section view of a micromirror FIG. 8b during an exemplary fabrication process is illustrated therein. The micromirror is formed on substrate 210, which can be glass (e.g. 1737F, Eagle 2000, quartz, Pyrex™, sapphire) that is transparent to visible light. First sacrificial layer 240 is deposited on substrate 210 followed by forming mirror plate 232. First sacrificial layer 240 may be any suitable material, such as amorphous silicon, or could alternatively be a polymer or polyimide, or even polysilicon, silicon nitride, silicon dioxide and tungsten, depending upon the choice of sacrificial materials, and the etchant selected. In the embodiment of the invention, the first sacrificial layer is amorphous silicon, and it is preferably deposited at 300–350° C. The thickness of the first sacrificial layer can be wide ranging depending upon the micromirror size and desired title angle of the micro-micromirror, though a thickness of from 500 Å to 50,000 Å, preferably close to 25,000 Å, is preferred. The first sacrificial layer may be deposited on the substrate using any suitable method, such as LPCVD or PECVD.

As an optional feature of the embodiment, an anti-reflection film maybe deposited on the surface of substrate 210. The anti-reflection film is deposited for reducing the reflection of the incident light from the surface of the substrate. Of course, other optical enhancing films may be deposited on either surface of the glass substrate as desired. In addition to the optical enhancing films, an electrode may be formed on a surface of substrate 210. The electrode can be formed as an electrode grid or a series of electrode segments (e.g. electrode strips) around the mirror plate. Alternatively, the electrode can be formed as an electrode film on the surface of substrate 210, in which case, the electrode film is transparent to visible light. The electrode can be used for driving the mirror plate to either the ON state or the OFF state. Alternatively, a light absorbing grid can be deposited on a surface of the glass substrate and around or below each micromirror. The light absorbing frame absorbs light incident onto and/or scattered light from the edges of the micromirrors. The absorption of the scattered light improves the quality of performance, such as contrast ratio, of the micromirror.

After depositing the first sacrificial layer, mirror plate 232 is deposited and patterned on the first sacrificial layer. Because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. The thickness of the micromirror plate can be wide ranging depending upon the desired mechanical (e.g. elastic module), the size of the micromirror, desired ON state angle and OFF state angle, and electronic (e.g. conductivity) properties of the mirror plate and the properties of the materials selected for forming the micromirror plate. According to the invention, a thickness from 500 Å to 50,000 Å, preferably around 2500 Å, is preferred for the mirror plate. In an embodiment of the invention, mirror plate 232 is a multi-layered structure, which comprises a $SiO_x$ layer with a preferred thickness around 400 Å, a light reflecting layer of aluminum with a preferred thickness around 2500 Å, a titanium layer with a preferred thickness around 80 Å, and a 200 Å $TiN_x$ layer. In addition to aluminum, other materials, such as Ti, AlSiCu and TiAl, having high reflectivity to visible light can also be used for the light reflecting layer. These mirror plate layers can be deposited by PVD at a temperature preferably around 150° C.

After deposition, mirror plate 232 is patterned into a desired shape, such as that in FIG. 8b or FIG. 9b. The patterning of the micromirror can be achieved using standard photoresist patterning followed by etching using, for example CF4, Cl2, or other suitable etchant depending upon the specific material of the micromirror plate layer.

After patterning mirror plate 232, second sacrificial layer 242 is deposited on the mirror plate 232 and first sacrificial layer 240. The second sacrificial layer may comprise amorphous silicon, or could alternatively comprise one or more of the various materials mentioned above in reference to the first sacrificial layer. First and second sacrificial layers need not be the same, although they are the same in the preferred embodiment so that, in the future, the etching process for removing these sacrificial materials can be simplified. Similar to the first sacrificial layer, the second sacrificial layer may be deposited using any suitable method, such as LPCVD or PECVD. In the embodiment of the invention, the second sacrificial layer comprises amorphous silicon deposited at approximate 350° C. The thickness of the second sacrificial layer can be on the order of 12,000 Å, but may be adjusted to any reasonable thickness, such as between 2,000 Å and 20,000 Å depending upon the desired distance (in the direction perpendicular to the micromirror plate and the substrate) between the micromirror plate and the hinge. It is preferred that the hinge and mirror plate be separated by a gap with a size from 0.1 to 1.5 microns, more preferably from 0.1 to 0.45 micron, and more preferably from 0.25 to 0.45 microns. Larger gaps could also be used, such as a gap from 0.5 to 1.5 micrometers, or from 0.5 to 0.8 micrometer, or from 0.8 to 1.25 micrometers, or from 1.25 to 1.5 micrometers.

In the preferred embodiment of the invention, the micromirror plate comprises aluminum, and the sacrificial layers (e.g. the first and second sacrificial layer) are amorphous silicon. This design, however, can cause defects due to the diffusion of the aluminum and silicon, especially around the edge of the mirror plate. To solve this problem, a protection layer (not shown) maybe deposited on the patterned micromirror plate before depositing the second sacrificial silicon layer such that the aluminum layer can be isolated from the silicon sacrificial layer. This protection may or may not be removed after removing the sacrificial materials. If the protection layer is not to be removed, it is patterned after deposition on the mirror plate.

The deposited second sacrificial layer is then patterned for forming two deep-via areas 248 and shallow via area 246 using standard lithography technique followed by etching, as shown in the figure. The etching step may be performed using $Cl_2$, $BCl_3$, or other suitable etchant depending upon the specific material(s) of the second sacrificial layer. The distance across the two deep-via areas depends upon the length of the defined diagonal of the micromirror plate. In an embodiment of the invention, the distance across the two deep-via areas after the patterning is preferably around 10 μm, but can be any suitable distance as desired. In order to form the shallow-via area, an etching step using $CF_4$ or other suitable etchant may be executed. The shallow-via area, which can be of any suitable size, is preferably on the order of 2.2 square microns. And the size of each deep-via is approximate 1.0 micron.

After patterning the second sacrificial layer, hinge structure layer 250 is deposited on the patterned second sacrificial layer. Because the hinge structure is designated for holding the hinge (e.g. hinge 222 in FIG. 8b) and the micromirror plate (e.g. mirror plate 232 in FIG. 8b), it is desired that the hinge structure layer comprises of materials having at least large elastic modulus. According to an embodiment of the invention, hinge structure layer 250 comprises a 400 Å thickness of $TiN_x$ (although it may comprise $TiN_x$, and may have a thickness between 100 Å and 2000 Å) layer deposited by PVD, and a 3500 Å thickness of $SiN_x$ (although the thickness of the $SiN_x$ layer may be between 2000 Å and 10,000 Å) layer 350 deposited by PECVD. Of course, other suitable materials and methods of deposition may be used (e.g. methods, such as LPCVD or sputtering). The $TiN_x$ layer is not necessary for the invention, but provides a conductive contact surface between the micromirror and the hinge in order to, at least, reduce charge-induced stiction.

After the deposition, hinge structure layer 250 is patterned into a desired configuration, such as hinge structure 218 in FIG. 8b. An etching step using one or more proper etchants is executed in patterning the hinge structure layer. In particular, the layer can be etched with a chlorine chemistry or a fluorine chemistry where the etchant is a perfluorocarbon or hydrofluorocarbon (or $SF_6$) that is energized so as to selectively etch the hinge support layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge support layer (e.g. chlorine chemistry for a metal layer, hydrocarbon or fluorocarbon (or $SF_6$) plasma for silicon or silicon compound layers, etc.).

Figure 10B:
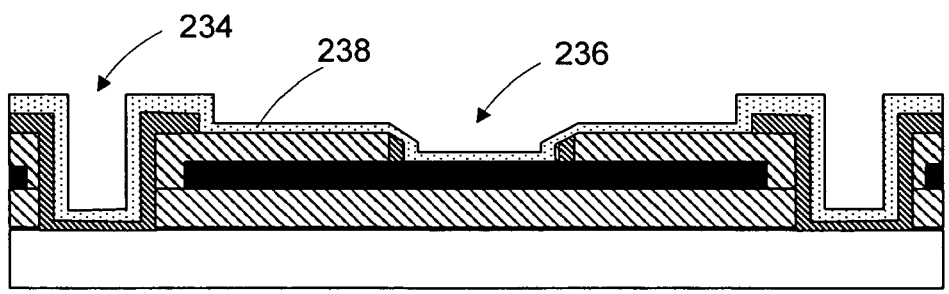
Figure 10C:
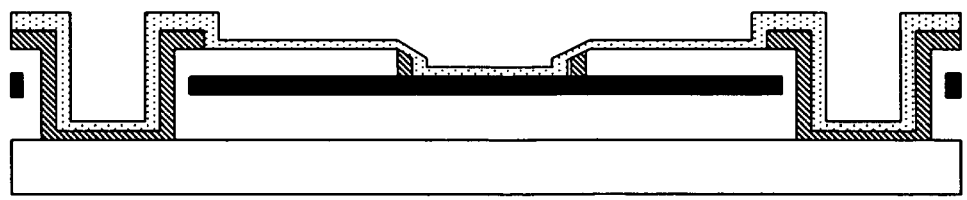

Referring to FIG. 10b, after patterning the hinge structure layer, the bottom segment of contact area 236 is removed and part of the micromirror plate underneath the contact area is thus exposed to hinge layer 238, which is deposited on the patterned hinge structure layer, to form an electric-contact with external electric source. The sidewalls of contact area 236 are left with residues of the hinge structure layers after patterning. The residue on the sidewalls helps to enhance the mechanical and electrical properties of the hinge. Each of the two deep-via areas 234 on either side of the mirror can form a continuous element with the deep-via areas corresponding to the adjacent micromirror in an array.

In the embodiment of the invention, the hinge layer is also used as an electric contact for the micromirror plate. It is desired that the material of the hinge layer is electrically conductive. Examples of suitable materials for the hinge layer are silicon nitride, silicon oxide, silicon carbide, polysilicon, Al, Ir, titanium, titanium nitride, titanium oxide(s), titanium carbide, $CoSiN_x$, $TiSiN_x$, $TaSiN_x$, or other ternary and higher compounds. When titanium is selected for the hinge layer, it can be deposited at 100° C. Alternatively, the hinge layer may comprise of multi-layers, such as 100 Å $TiN_x$ and 400 Å $SiN_x$.

After deposition, the hinge layer is then patterned as desired using etching. Similar to the hinge structure layer, the hinge layer can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

After the hinge is formed, the micromirror is released by removing the sacrificial materials of the first and second sacrificial layers, which will be discussed in detail in the following with reference to FIG. 11 and FIG. 12. A cross-sectional view of the released micromirror device is presented in FIG. 10c.

In order to efficiently remove the sacrificial material (e.g. amorphous silicon), the release etching utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are gas phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise inner gas components such as ($N_2$, Ar, Xe, He, etc.). In this way, the remaining sacrificial material is removed and the micromechanical structure is released. In one aspect of such an embodiment, $XeF_2$ is provided in an etching chamber with diluents (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

Figure 13:
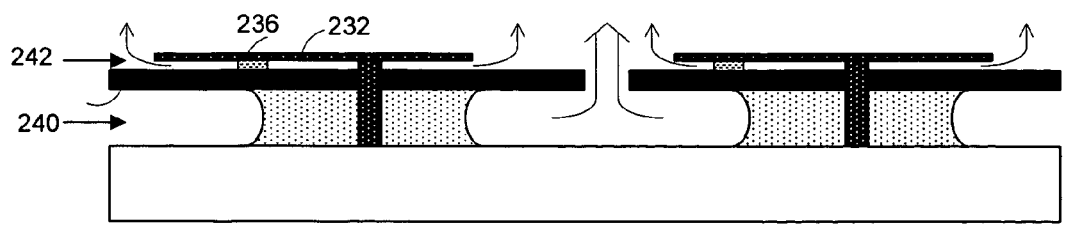
FIG. 13 is a cross-sectional view of a mirror device in the midst of an etching process.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SCCO_2$, or super critical $CO_2$ (the use of super critical $CO_2$ as an etchant is described in U.S. patent application Ser. No. 10/167,272, which is incorporated herein by reference). However, spontaneous vapor phase chemical etchants are more preferred, because the sacrificial material, such as amorphous silicon within small spaces, (such as lateral gap 242 (between the mirror plate and the hinge) and small gap 240 (between the substrate and the mirror plate) in FIG. 13) can be efficiently removed via gaps between adjacent mirror plates and the lateral gap as compared to other sacrificial materials (e.g. organic materials) and other etching methods. Though not required in all embodiments of the present invention, a micromirror array with a small gap, a small pitch and a small distance between the hinge and the mirror plate can thus be more easily fabricated with such spontaneous vapor phase chemical etchants.

Figure 11:
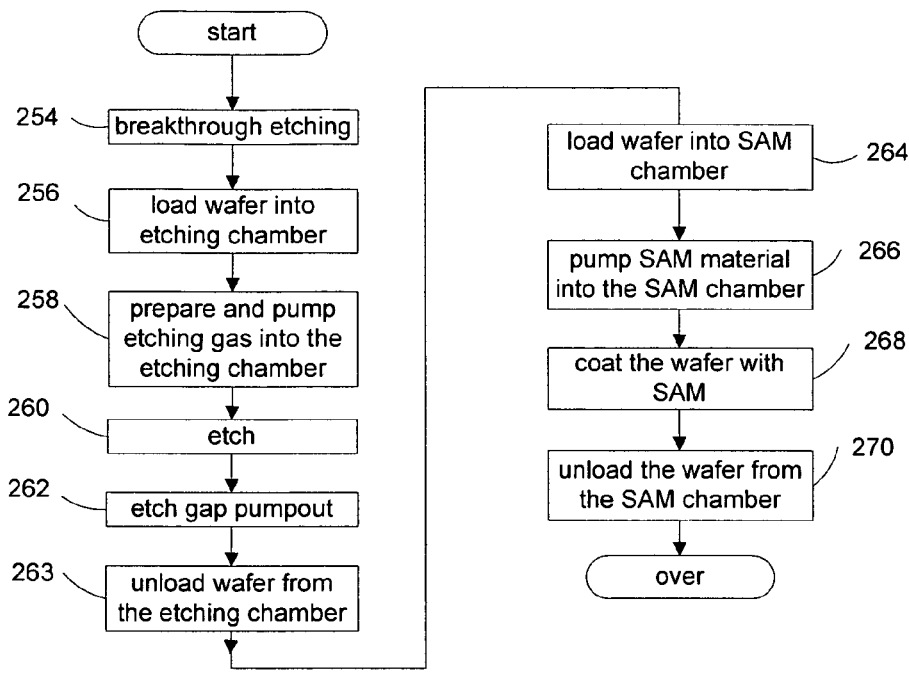
FIG. 11 is a flow chart showing steps executed in an etching process for removing sacrificial layers.
Figure 12:
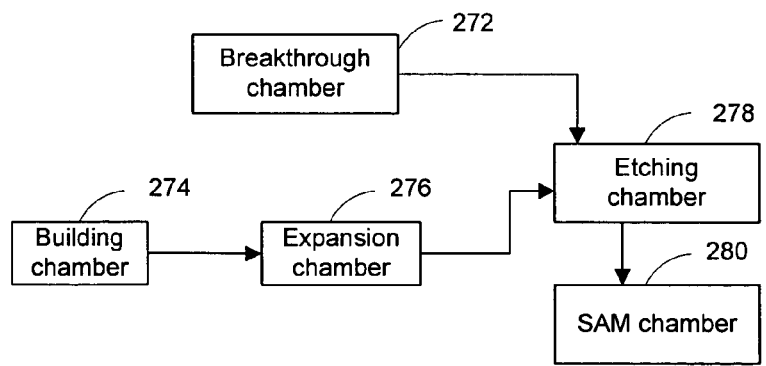
FIG. 12 is a block diagram showing major components used in the etching process of FIG. 1.

Referring to FIG. 11, a flow chart shows the steps executed in an exemplary etching process for removing the sacrificial material (amorphous silicon). The etching process starts at a breakthrough etching (step 254) in breakthrough etching chamber (272 in FIG. 12) of an etching system for removing the oxidation layers on the surfaces of the micromirror. This etching step may lasts for tens of seconds. In a preferred embodiment of the invention, the micromirror is breakthrough etched around 30 seconds. The micromirror is then loaded into the etching chamber (e.g. 278 in FIG. 12) of the etching system for etching the sacrificial materials. One or more vapor phase etchants are prepared (step 258) in the building chamber (e.g. 274 in FIG. 12) for vaporizing the etchants and the expansion chamber (e.g. 276 in FIG. 12) for setting the vapor phase etchants to a certain pressure. The expanded vapor phase etchants are then pumped into (step 258) the etching chamber (e.g. etching chamber 278 in FIG. 12). The micromirror is then etched in the etching chamber for a time preferably around 1200 seconds so as to thoroughly remove the sacrificial materials. The etching of the micromirror in the etching chamber may be performed with an end-point detection technique for real-timely monitoring the etching process in the etching chamber. In particular, a residual gas analyzer, which analyzes the gas from the etching chamber, is preferably used. The residual gas analyzer measures the chemical components and the density of certain component (it can also measure the density variation rate of the certain component) of the gas from the etching chamber. From the measurements, the amount of sacrificial material inside the etching chamber may be derived. With the end-point detection, over-etching and incomplete etching may be avoided. When the etching in the etching chamber is finished (the sacrificial material is removed from the micromirror), the etching chamber is cleaned by pumping out the gases inside the etching chamber (step 262). The etched micromirror is then unloaded from the etching chamber (step 264). As an optional feature of the embodiment, the micromirror after etching is coated with a self-assembled-monolayer (SAM) for protecting the micromirror (e.g. from a trichlorosilane or trialkanesilane precursors). The SAM coating is performed at steps 264 through 270. Following step 263, wherein the micromirror is unloaded from the etching chamber, the micromirror is loaded into the SAM chamber (e.g. SAM chamber 280 in FIG. 12) (step 264). The SAM material is then pumped into the SAM chamber (step 266). The micromirror inside the SAM chamber is exposed to the SAM material for around 60 seconds, and coated with the SAM materials thereby. Finally, the micromirror is unloaded from the SAM chamber (step 270).

It will be appreciated by those of ordinary skill in the art that a new and useful spatial light modulator and a method of fabricating the spatial light modulator have been described herein. In view of many possible embodiments to which the principles of this invention may be applied, however, it should be recognized that the embodiments described herein with respect to the drawing figures are meant to be illustrative only and should not be taken as limiting the scope of invention. For example, those of ordinary skill in the art will recognize that the illustrated embodiments can be modified in arrangement and detail without departing from the spirit of the invention. In particular, the micromirrors and the electrode and circuitry can be formed on the same substrate. Also, though PVD and CVD are referred to above, other thin film deposition methods could be used for depositing the layers, including spin-on, sputtering, anodization, oxidation, electroplating and evaporation. Therefore, the invention as described herein contemplates all such embodiments as may come within the scope of the following claims and equivalents thereof.

We claim:

1. A spatial light modulator, comprising:
    an array of movable mirror plates formed on a substrate for selectively reflecting a light beam incident on the mirror plates, wherein each mirror plate is attached to a deformable hinge that is spaced apart from the mirror plate from 0.15 to 1.5 micrometers in a direction perpendicular to the mirror plate;
    wherein adjacent mirror plates of the array have a gap from 0.15 to 0.5 micrometers when the adjacent mirror plates are parallel to the substrate.

2. The spatial light modulator of claim 1, further comprising:
    a hinge that is attached to each mirror plate such that the mirror plate can rotate relative to the substrate, wherein the hinge and the mirror plate are spaced apart from 0.5 to 1.5 micrometers.

3. The spatial light modulator of claim 1, wherein the adjacent mirror plates have a center-to-center distance from 4.28 to 10.16 micrometers.

4. The spatial light modulator of claim 1, wherein the array of mirror plates comprises at least 1280 mirror plates along a length of the mirror plate array.

5. The spatial light modulator of claim 1, wherein the array of mirror plates comprises at least 1400 mirror plates along a length of the mirror plate array.

6. The spatial light modulator of claim 1, wherein the array of mirror plates comprises at least 1600 mirror plates along a length of the mirror plate array.

7. The spatial light modulator of claim 1, wherein the array of mirror plates comprises at least 1920 mirror plates along a length of the mirror plate array.

8. The spatial light modulator of claim 1, wherein the adjacent mirror plates has a gap of 0.5 micrometers or less therebetween when the adjacent mirror plates are parallel to the substrate.

9. The spatial light modulator of claim 2, wherein a distance between the hinge and the mirror plate is from 0.5 to 0.8 micrometers.

10. The spatial light modulator of claim 2, wherein a distance between the hinge and the mirror plate is from 0.8 to 1.25 micrometers.

11. The spatial light modulator of claim 2, wherein a distance between the hinge and the mirror plate is from 1.25 to 1.5 micrometers.

12. The spatial light modulator of claim 3, wherein the center-to-center distance of adjacent mirror plates is from 6.23 to 9.34 micrometers.

13. The spatial light modulator of claim 3, wherein the center-to-center distance of adjacent mirror plates is from 4.38 to 6.57 micrometers.

14. The spatial light modulator of claim 3, wherein the center-to-center distance of adjacent mirror plates is from 4.38 to 9.34 micrometers.

15. The spatial light modulator of claim 1, further comprising: a hinge attached to the mirror plate such that the mirror plate can rotate relative to the substrate along a rotation axis that is parallel to but offset from a diagonal of the mirror plate when viewed from the top of the mirror plate; wherein the mirror plate can rotate to an angle at least 14 degrees relative to the substrate; and wherein the adjacent mirror plates has a center-to-center distance from 4.38 to 10.16 micrometers; and wherein the hinge and the mirror plate is spaced apart from 0.5 to 1.5 micrometers.

16. The spatial light modulator of claim 1, further comprising:
    an electrode proximate to each mirror plate for electrostatically deflecting the mirror plate.

17. The spatial light modulator of claim 1, wherein the substrate is glass or quartz that is visible light transmissive.

18. The spatial light modulator of claim 17, wherein the substrate comprises an anti-reflection film on a surface of the substrate.

19. The spatial light modulator of claim 17, wherein the substrate comprises a light absorption frame around an edge of the substrate.

20. The spatial light modulator of claim 1, wherein each mirror plate has an area; and
wherein a ratio of a summation of all areas of the mirror plates to an area of the substrate is 90 percent or more.

21. The spatial light modulator of claim 1, wherein each mirror plate rotate relative to the substrate in response to an electrostatic field.

22. The spatial light modulator of claim 1, further comprising:
a first electrode that drives the mirror plate rotate in a first rotation direction relative to the substrate; and
a second electrode that drives the mirror plate rotate in a second rotation direction opposite to the first rotation direction relative to the substrate.

23. The spatial light modulator of claim 22, wherein the first electrode and the second electrode are on the same side relative to the rotation axis of the mirror plate.

24. The spatial light modulator of claim 22 wherein the first electrode and the second electrode are on the opposite sides relative to the rotation axis of the mirror plate.

25. The spatial light modulator of claim 1, wherein the substrate is semiconductor.

26. The spatial light modulator of claim 1, wherein the gap between the adjacent mirror plates is from 0.15 to 0.25 micrometers.

27. The spatial light modulator of claim 1, wherein the gap between the adjacent mirror plates is from 0.25 to 0.5 micrometers.

28. The spatial light modulator of claim 1, wherein the gap between the adjacent mirror plates is 0.5 micrometers or less.

29. The spatial light modulator of claim 1, wherein the distance between the hinge and the mirror plate is from 0.15 to 0.25 micrometers.

30. The spatial light modulator of claim 1, wherein the mirror plate is attached to a hinge such that the mirror plate rotates in a first direction to an angle from 15° degrees to 27° degrees relative to the substrate.

31. The spatial light modulator of claim 30, wherein the mirror plate is attached to the hinge such that the mirror plate rotates in a second direction to an angle from 2° degrees to 9° degrees relative to the substrate.

32. The spatial light modulator of claim 1, wherein the mirror plate is attached to a hinge such that the mirror plate rotates in a first direction to an angle from 17.5° degrees to 22.5° degrees relative to the substrate.

33. The spatial light modulator of claim 30, wherein the mirror plate is attached to the hinge such that the mirror plate rotates in a second direction to an angle from 2° degrees to 9° degrees relative to the substrate.

34. The spatial light modulator of claim 1, wherein the mirror plate is attached to a hinge such that the mirror plate rotates in a first direction to an angle around 20° degrees relative to the substrate.

35. The spatial light modulator of claim 34, wherein the mirror plate is attached to the hinge such that the mirror plate rotates in a second direction to an angle from 2° degrees to 9° degrees relative to the substrate.

36. The spatial light modulator of claim 1, wherein the mirror plate is attached to the hinge such that the mirror plate rotates in a first direction to an angle around 30° degrees relative to the substrate.

37. The spatial light modulator of claim 36, wherein the mirror plate is attached to the hinge such that the mirror plate rotates in a second direction to an angle from 2° degrees to 9° degrees relative to the substrate.

38. The spatial light modulator of claim 3, wherein the mirror plate is attached to the hinge such that the mirror plate rotates in a first rotation direction to an angle from 12° degrees to 20° degrees relative to the substrate.

39. The spatial light modulator of claim 38, wherein the mirror plate is attached to the hinge such that the mirror plate rotates in a second direction to an angle from 2° degrees to 9° degrees relative to the substrate.

40. The spatial light modulator of claim 2, wherein the mirror plate is attached to the hinge such that the mirror plate rotates in a first rotation direction to an angle from 12° degrees to 20° degrees relative to the substrate.

41. The spatial light modulator of claim 40, wherein the mirror plate is attached to the hinge such that the mirror plate rotates in a second direction to an angle from 2° degrees to 9° degrees relative to the substrate.

42. The spatial light modulator of claim 3, wherein the mirror plate is attached to the hinge such that the mirror plate rotates in a first rotation direction to an angle from 12° degrees to 20° degrees relative to the substrate; and wherein the hinge and the mirror plate is spaced apart from 0.5 to 1.5 micrometers.

43. The spatial light modulator of claim 40, wherein the mirror plate is attached to the hinge such that the mirror plate rotates in a second direction to an angle from 2° degrees to 9° degrees relative to the substrate.

44. The spatial light modulator of claim 1, wherein each mirror plate is held on the substrate via a hinge that is separated from the respective mirror plate by a gap.

45. The spatial light modulator of claim 1, wherein the gap between the mirror plate and hinge is from 0.15 to 1.5 micrometers.

46. The spatial light modulator of claim 45, wherein the gap between the mirror plate and hinge is from 0.15 to 0.45 micrometers.

47. The spatial light modulator of claim 46, wherein the gap between the mirror plate and hinge is from 0.5 to 1.5 micrometers.

48. A projection system, comprising:
a light source;
the spatial light modulator of claim 1;
a first lens for directing light from the light source onto the spatial light modulator; and
a second lens for directing light reflected from the spatial light modulator onto a display target.

49. The system of claim 48, wherein the light source is an arc lamp having an effective arc length around 1.0 millimeter.

50. The system of claim 48, wherein the light source is an arc lamp having an effective arc length less than 1.0 millimeter.

51. The system of claim 48, wherein the light source is an arc lamp having an effective arc length around 0.7 millimeter.

52. The system of claim 48, further comprising:
a video signal input that inputs a plurality of video signals, based on which the mirror plates of the spatial light modulator selectively reflects light such that the reflected light from the mirror plates forms a plurality of videos on the display target.

* * * * *